US012513859B2

(12) United States Patent
Lin

(10) Patent No.: US 12,513,859 B2
(45) Date of Patent: Dec. 30, 2025

(54) HEAT-DISSIPATION HOLDER AND PROTECTIVE CASE FOR ELECTRONIC EQUIPMENT

(71) Applicant: SHENZHEN BENKS TECHNOLOGY CO., LTD, Shenzhen (CN)

(72) Inventor: Xiaojiong Lin, Shenzhen (CN)

(73) Assignee: SHENZHEN BENKS TECHNOLOGY CO., LTD, Shenzhen (CN)

( * ) Notice: Subject to any disclaimer, the term of this patent is extended or adjusted under 35 U.S.C. 154(b) by 277 days.

(21) Appl. No.: 18/144,254

(22) Filed: May 8, 2023

(65) Prior Publication Data
US 2023/0363114 A1 Nov. 9, 2023

(30) Foreign Application Priority Data

| May 8, 2022 | (CN) | 202221087809.9 |
| Jun. 9, 2022 | (CN) | 202221459979.5 |
| Jun. 9, 2022 | (CN) | 202221462196.2 |
| Dec. 31, 2022 | (CN) | 202223613585.3 |

(51) Int. Cl.
H05K 7/20 (2006.01)
F16M 11/10 (2006.01)
F16M 11/20 (2006.01)

(52) U.S. Cl.
CPC ....... *H05K 7/20436* (2013.01); *F16M 11/105* (2013.01); *F16M 11/2021* (2013.01)

(58) Field of Classification Search
CPC ............ H05K 7/20436; F16M 11/105; F16M 11/2021
USPC ......................................................... 361/704
See application file for complete search history.

(56) References Cited

U.S. PATENT DOCUMENTS

| 8,218,321 | B2* | 7/2012 | Foxenland | G06F 1/203 |
| | | | | 174/15.1 |
| 8,624,111 | B2* | 1/2014 | Tages | G06F 1/1628 |
| | | | | 455/575.8 |
| 9,127,898 | B2* | 9/2015 | Wong | F28F 21/00 |
| 9,274,554 | B2* | 3/2016 | Wong | H04B 1/3888 |
| 9,436,239 | B1* | 9/2016 | Shannon, III | G06F 1/206 |
| 9,456,066 | B2* | 9/2016 | Singhal | A45F 5/00 |
| 9,608,686 | B1* | 3/2017 | Coulter | H04B 1/036 |
| 10,063,270 | B2* | 8/2018 | Coulter | H04B 1/3888 |
| D854,001 | S * | 7/2019 | Shannon, III | D14/250 |
| 10,345,055 | B2* | 7/2019 | Krantz | H01L 23/34 |
| 10,615,837 | B1* | 4/2020 | Amato | H04M 1/0202 |
| 11,119,544 | B1* | 9/2021 | Perez | H05K 7/20154 |
| 2009/0059481 | A1* | 3/2009 | Taylor | H04B 1/3888 |
| | | | | 361/679.01 |
| 2009/0215508 | A1* | 8/2009 | Huang | H04M 1/0235 |
| | | | | 455/575.4 |

(Continued)

Primary Examiner — Anatoly Vortman
(74) Attorney, Agent, or Firm — Andrew C. Cheng

(57) ABSTRACT

A heat dissipation holder and a protective case for electronic equipment are provided. Both the heat dissipation holder and the protective case are provided with a heat dissipation gel structure. By providing a heat dissipation gel structure that not only contacts the electronic device but also communicates with outside air, a large and effective heat dissipation and temperature reduction of the electronic device can be achieved, and excellent heat dissipation and safety protection of the device can be realized.

11 Claims, 12 Drawing Sheets

(56) References Cited

U.S. PATENT DOCUMENTS

| | | | | |
|---|---|---|---|---|
| 2012/0327565 A1* | 12/2012 | Tages | ............... | G06F 1/1628 |
| | | | | 361/679.01 |
| 2013/0146491 A1* | 6/2013 | Ghali | ............... | G06F 1/1626 |
| | | | | 53/472 |
| 2015/0000884 A1* | 1/2015 | Jiang | ............... | G06F 1/203 |
| | | | | 165/185 |
| 2015/0034291 A1* | 2/2015 | Wong | ............... | F28F 21/00 |
| | | | | 165/185 |
| 2015/0076186 A1* | 3/2015 | Wong | ............... | G06F 1/20 |
| | | | | 224/191 |
| 2016/0101902 A1* | 4/2016 | Kim | ............... | F16M 11/00 |
| | | | | 206/45.23 |
| 2017/0187411 A1* | 6/2017 | Coulter | ............... | F25D 5/02 |
| 2017/0203135 A1* | 7/2017 | Cordani | ............... | B65D 65/38 |
| 2017/0230072 A1* | 8/2017 | Kim | ............... | F16M 11/041 |
| 2019/0198212 A1* | 6/2019 | Levy | ............... | F16M 11/2021 |
| 2020/0288833 A1* | 9/2020 | Fathollahi | ............... | A45C 11/00 |
| 2024/0283860 A1* | 8/2024 | Li | ............... | H05K 5/0211 |

\* cited by examiner

HEAT-DISSIPATION HOLDER AND PROTECTIVE CASE FOR ELECTRONIC EQUIPMENT

TECHNICAL FIELD

The disclosure relates to the technical field of heat dissipation of electronic equipment, in particular to a heat dissipation holder and a protective case for electronic equipment.

BACKGROUND

As electronic devices become more and more a part of people's work and life, electronic device holders matching with electronic devices have also become auxiliary devices for liberating people's hands. In addition to the basic support and fixing functions, the current electronic device holders also have heat dissipation functions, but the heat dissipation methods are generally hollow ventilation, fan air cooling, or semiconductor cooling fins. The heat dissipation effect is not good, making it difficult to effectively cool and dissipate heat for electronic devices with increasing power.

In addition, electronic devices will generate a lot of heat when they are in use. If the heat is not dissipated in time, the temperature inside will rise. The high temperature will reduce the performance of electronic devices and affect the user experience. Therefore, it is urgent to provide a protective case for electronic devices.

SUMMARY

In order to solve the problem of heat dissipation on the surface of the existing electronic devices, the disclosure provides a heat dissipation holder for electronic equipment and a protective case for electronic equipment.

The present disclosure provides a heat dissipation holder for electronic equipment, which is used to support and position an electronic device and to dissipate heat for the electronic device, including a support assembly and a positioning assembly connected to the support assembly, and the positioning assembly is used to be in contact with and secure the electronic device.

The positioning assembly includes a bottom plate. A heat dissipation gel structure is provided on the bottom plate. A ventilation channel is defined on at least part of the region of the bottom plate on which the heat dissipation gel structure is disposed. One side of the heat dissipation gel structure is in contact with the electronic device, and the other side thereof is communicated with ambiance through the ventilation channel.

Preferably, a receiving groove is defined on one side of the bottom plate close to the heat dissipation gel structure, the heat dissipation gel structure is attached to and fitted with the bottom wall of the receiving groove, and the bottom wall of the receiving groove defines the ventilation channel.

Preferably, the positioning assembly further includes a connecting member that includes a connecting plate connected to one side of the bottom plate away from the receiving groove and a rotating shaft disposed at one end of the connecting member away from the connecting plate. A shaft hole is defined at one end of the support assembly connected to the positioning assembly. The rotating shaft is damply fitted with the shaft hole.

Preferably, the positioning assembly further includes a magnetic attraction member connected to the connecting plate, and the magnetic attraction member is disposed between the bottom wall of the receiving groove and the heat dissipation gel structure or in the bottom plate or on one side of the bottom plate away from the receiving groove. The magnetic field of the magnetic attraction member passes through the heat dissipation gel structure to magnetically attract the electronic device.

Preferably, one side of the bottom plate facing the heat dissipation gel structure further defines a groove and a magnetic attraction strip disposed in the groove, and the magnetic field of the magnetic attraction strip passes through the heat dissipation gel structure to magnetically attract the electronic device.

Preferably, the positioning assembly further includes a clamping assembly connected to the bottom plate to clamp the electronic device. The support assembly further includes a connecting assembly connected to one side of the bottom plate away from the heat dissipation gel structure to secure the heat dissipation holder for electronic equipment to an external device.

Preferably, the heat dissipation gel structure is a flexible material, and the heat dissipation gel structure includes a heat conduction layer, a heat dissipation layer containing heat dissipation hydrogel and a protective layer sequentially stacked from a direction close to the electronic device to a direction away from the electronic device. A ventilation structure communicated with the ventilation channel is defined on the protective layer.

Preferably, the reducing temperature of the heat dissipation gel structure to the electronic device is in the range of 1-6° C.

Preferably, the heat dissipation holder for electronic equipment is any one of a heat dissipation holder for mobile phones, for tablet computers, for notebook computers and for e-readers.

To solve the above problems, the present disclosure further provides a protective case for electronic equipment, which is mounted on the exterior of an electronic device, including a case body and a heat dissipation gel structure. The case body defines a receiving groove for accommodating the electronic device, and the heat dissipation gel is disposed in the receiving groove. A first ventilation structure is defined on at least part of the region of the case body on which the heat dissipation gel structure is disposed, and the heat dissipation gel structure is communicated with ambiance through the first ventilation structure.

Preferably, the area of the first ventilation structure accounts for 20%-70% of the plane area of the case body.

Preferably, at least one support block is provided on one side of the case body away from the heat dissipation gel structure.

Preferably, the heat dissipation gel structure is a flexible material, and the hardness of the case body is greater than that of the heat dissipation gel structure.

Preferably, the heat dissipation gel structure includes a flexible heat conduction layer, a flexible heat dissipation layer and a flexible protective layer; and/or the heat dissipation gel structure includes the flexible heat conduction layer in contact with the electronic device and/or the flexible heat dissipation layer containing heat dissipation hydrogel and/or the air-permeable, waterproof and dust-proof flexible protective layer.

Preferably, the area of the flexible heat conduction layer or the flexible protective layer is greater than or equal to the area of the flexible heat dissipation layer; or the flexible protective layer defines a second ventilation structure. The aperture of the second ventilation structure is smaller than the aperture of the first ventilation structure on the case body.

Preferably, the protective case for electronic equipment further includes a magnetic attraction member disposed on the case body. A groove extending along the thickness direction of the case body is defined at a position of the case body on which the heat dissipation gel structure is disposed, and the magnetic attraction member is accommodated in the groove. The magnetic attraction member is a ring magnet, and the thickness of the magnetic attraction member is less than or equal to the depth of the groove. Or the heat dissipation gel structure covers the bottom of the receiving groove. The first ventilation structure is not provided on the groove, and the first ventilation structure is provided at the bottom of the receiving groove corresponding to the heat dissipation gel structure except the region where the groove is defined.

Preferably, the magnetic attraction member is disposed between the case body and the heat dissipation gel structure, and the magnetic field of the magnetic attraction member passes through the heat dissipation gel structure to magnetically attract the electronic device; or the first ventilation is not provided at a position of the case body corresponding to the magnetic attraction member.

Preferably, the thickness of the flexible heat conduction layer is in the range of 0.1-0.5 mm, the thickness of the flexible heat dissipation layer is in the range of 0.5-0.7 mm, and the thickness of the flexible protective layer is in the range of 0.1-0.3 mm; or the thickness of the heat dissipation gel structure is in the range of 1.0-1.2 mm.

Preferably, the reducing temperature of the protective case for electronic equipment to the surface of the electronic device that generates heat is in the range of 1-6° C.

Preferably, the protective case for electronic equipment is used for mobile phones, Pads, PDAs, notebook computers or other small electronic devices.

Compared with the prior art, the heat dissipation holder for electronic equipment and the protective case for electronic equipment of the present disclosure have the following beneficial effects:

1. The heat dissipation holder for electronic equipment of the present disclosure is used to support and position an electronic device and to dissipate heat. The heat dissipation holder includes a support assembly and a positioning assembly connected to the support assembly, and the positioning assembly is used to contact and fix the electronic device. The positioning assembly includes a bottom plate, on which a heat dissipation gel structure is disposed, and at least part of the region of the bottom plate corresponding to the heat dissipation gel structure is provided with a ventilation channel. One side of the heat dissipation gel structure is in contact with the electronic device, and the other side thereof communicates with the ambiance through the ventilation channel. By providing the heat dissipation gel structure that not only contacts the electronic device but also communicates with the ambiance through the ventilation channel, a large and effective heat dissipation and temperature reduction of the electronic device carried thereon can be realized, and the safety of the electronic device and the excellent experience of the user can be achieved.

2. The bottom plate of the heat dissipation holder is provided with a receiving groove on the side thereof close to the heat dissipation gel structure, and the heat dissipation gel structure is attached to and fitted with the bottom wall of the receiving groove. The bottom wall of the receiving groove is provided with a ventilation channel. It can be understood that the heat dissipation gel structure is attached to the bottom wall of the receiving groove of the bottom plate. In actual use, the covering effect of the receiving groove can prevent the heat dissipation gel structure from falling off from the bottom plate. In addition, the heat dissipation gel structure can be close to the ventilation channel to achieve effective ventilation and heat dissipation.

3. The heat dissipation holder further includes a connecting member, and the connecting member includes a connecting plate connected to the side of the bottom plate away from the receiving groove. A rotating shaft is provided at the end of the connecting member away from the connecting plate. One end of the support assembly used to connect the positioning assembly is provided with a shaft hole, and the rotating shaft is damply fitted with the shaft hole. It can be understood that the positioning assembly and the support assembly are connected, and the damping fit can allow the rotating shaft to be rotatably connected to the shaft hole and maintain the relative position after rotation through the damping force, that is, after the positioning assembly fixes the electronic device, the rotation adjustment of the use angle of the electronic device can be realized to improve the practicability thereof.

4. The positioning assembly further includes a magnetic attraction member connected to the connecting plate. The magnetic attraction member is disposed between the bottom wall of the receiving groove and the heat dissipation gel structure or in the bottom plate or on the side of the bottom plate away from the receiving groove. The magnetic field of the magnetic attraction member passes through the heat dissipation gel structure to magnetically attract the electronic device. It can be understood that the connection between the connection plate and the bottom plate is realized by providing the magnetic attraction member connected to the connecting plate and disposing the magnetic attraction member as described above, and the electronic device is fixed by the magnetic attraction member.

5. The bottom plate is further provided with a groove and a magnetic attraction strip arranged in the groove on the side thereof facing the heat dissipation gel structure, and the magnetic field of the magnetic attraction strip passes through the heat dissipation gel structure to magnetically attract the electronic device. It can be understood that the larger and heavier the electronic device, the greater the magnetic attraction force it needs. By providing the magnetic attraction strip, the weight range of the electronic device that can be carried can be increased, and the fixing of the electronic device can be further strengthened.

6. The positioning assembly further includes a clamping assembly connected to the bottom plate to clamp the electronic device. The support assembly also includes a connecting assembly connected to the side of the bottom plate away from the heat dissipation gel structure to secure the heat dissipation holder to an external device, which can achieve stable clamping of the electronic device and convenient connection with external devices.

7. The heat dissipation gel structure of the heat dissipation holder is a flexible material, and the heat dissipation gel structure includes a heat conduction layer, a heat dissipation layer containing a heat dissipation hydrogel and a protective layer that are sequentially stacked from a direction close to the electronic device to a direction away from the electronic device. It can be understood that the heat of the electronic device can be conducted to the heat dissipation layer and the protective layer for dissipation through the heat conduction layer, and the external water vapor can also be transmitted from the ambiance to the electronic device through the heat dissipation layer, which can realize heat conduction, heat dissipation and protection of the electronic device. In addition, it can be known that the hydrogel heat dissipation layer is a temperature-sensitive and flexible hydrogel film, which bionically sweats and dissipates heat at high temperature, and absorbs water for storage at low temperature. This cycle is as simple and efficient as human skin for heat dissipation. The principle of phase transition can take away most of the heat. Moreover, the protective layer is close to the ventilation channel, which can provide air and moisture transmission paths for the heat dissipation layer and prevent external dust from adhering and damaging the heat dissipation layer.
8. A ventilation structure communicated with the ventilation channel is formed on the protective layer of the heat dissipation holder. It can be understood that the protective layer needs to be air-permeable, dust-proof and waterproof, so a ventilation structure with small apertures needs to be formed. The bottom plate that pays more attention to the ventilation effect is hollowed out with the ventilation channel. The two can be air-connected to ensure that air and air moisture can be convection through the ventilation channel to the ventilation structure and then transferred to the heat dissipation layer, thereby achieving heat dissipation protection for the electronic device.
9. The reducing temperature of the heat dissipation gel structure to the electronic device is in the range of 1-6° C., which can realize the function of greatly and effectively cooling the electronic device.
10. The heat dissipation holder for electronic equipment of the present disclosure is any one of heat dissipation holder for mobile phones, for tablet computers, for notebook computers and for e-readers, which can meet the different needs of users.
11. The protective case for electronic equipment of the present disclosure is mounted on the exterior of an electronic device, and includes a case body, a magnetic attraction member and a heat dissipation gel structure. The case body forms a receiving groove for accommodating the electronic device, and the heat dissipation gel structure is formed in the receiving groove. At least part of the region of the case body corresponding to the heat dissipation gel structure is provided with a first ventilation structure, and the heat dissipation gel structure communicates with the ambiance through the first ventilation structure. By providing the heat dissipation gel structure, the protective case can have passive and active heat dissipation, which achieves excellent heat dissipation and safety protection for the electronic device.
12. The area of the first ventilation structure of the protective case accounts for 20%-70% of the plane area of the case body. It can be understood that by adjusting the proportion of different ventilation areas, the needs of different ventilation and heat dissipation efficiency can be met, and the balance of suitable materials and efficient heat dissipation can be achieved.
13. At least one support block is provided on the side of the case body of the protective case away from the heat dissipation gel structure. It can be understood that when the electronic device is equipped with the protective case needs to be placed on a bearing surface such as a tabletop, the support block can make the electronic device be at a certain height from the bearing surface because of the certain height thereof, thereby further ensuring that air can enter the heat dissipation gel structure smoothly from the space formed by height through the first ventilation structure to realize the heat dissipation protection of the electronic device.
14. The heat dissipation gel structure of the protective case is a flexible material, and the hardness of the case body is greater than that of the heat dissipation gel structure. By setting the hardness of the heat dissipation gel structure to be smaller than the hardness of the case body, when the case body hits external hard objects, the transmission of force will be greatly weakened by the case body and heat dissipation gel structure with different hardness, so as to realize the flexible protection of the electronic device.
15, The heat dissipation gel structure of the protective case includes a flexible heat conduction layer, a flexible heat dissipation layer and a flexible protective layer that are sequentially stacked from the bottom away from the receiving groove to the bottom close to the receiving groove. The flexible heat conduction layer, flexible heat dissipation layer and flexible protective layer realize the multiple protection of heat conduction, heat dissipation and protection of the electronic device.
16. The heat dissipation gel structure of the protective case includes a flexible heat conduction layer contacting the electronic device and/or a flexible heat dissipation layer containing heat dissipation hydrogel and/or a air-permeable, dust-proof and waterproof flexible protective layer. It can be understood that by selecting flexible and heat conduction materials to contact the electronic device, effective heat conduction and flexible collision protection for the electronic device can be achieved. By selecting a heat dissipation layer containing heat dissipation gel, the hydrogel absorbs water at room temperature, and take away heat at high temperature to achieve heat dissipation protection for the electronic device. By selecting a air-permeable, dust-proof, and waterproof protective layer, it is beneficial for the heat dissipation layer to absorb moisture in the air, which can achieve heat dissipation effect of the electronic device. The structure of the protective layer is conducive to the dust-proof and waterproof protection of the electronic device.
17. The area of the flexible heat conduction layer or the flexible protective layer of the protective case is greater than or equal to the area of the flexible heat dissipation layer, which can realize the coating protection of the flexible heat conduction layer or the flexible protective layer on the flexible heat-dissipating layer, and better realize heat dissipation effect of the flexible heat dissipation layer.
18. The protective case further includes a magnetic attraction member, which is disposed on the case body. By providing the magnetic attraction member on the case body, convenient placement and fixing of the electronic device can be realized.

19. The magnetic attraction member of the protective case is disposed between the case body and the heat dissipation gel structure. By specifically disposing the magnetic attraction member between the case body and the heat dissipation gel structure, the magnetic attraction member can be attracted to an external magnetic device without passing through the heat dissipation gel structure to achieve the maximum magnetic attraction of the magnetic attraction member.

20. The case body of the protective case is provided with a groove extending along the thickness direction of the case body at the position thereof corresponding to the heat dissipation gel structure, and the magnetic attraction member is accommodated in the groove. By providing the groove in the direction extending along the thickness of the housing, firstly, the groove can serve as a magnetic protective housing to accommodate and protect the magnetic attraction member; secondly, the magnetic attraction member is accommodated behind the groove, that is, accommodated on part of the region of the groove of the case body, which is conducive to forming a flat surface of the case body to effectively contact and fix the electronic device and can achieve aesthetics and more conducive to heat dissipation.

21. The magnetic attraction member of the protective case is a ring magnet, and the thickness of the magnetic attraction member is less than or equal to the depth of the groove. By providing the ring magnet with the thickness thereof less than or equal to the depth of the groove, sufficient magnetic attraction force can be achieved while avoiding the thickness of the protective case being too thick to dissipate heat and carry.

22. The heat dissipation gel structure of the protective case covers the entire bottom of the receiving groove, and the first ventilation structure is not provided on the groove. The the first ventilation structure is provided at the bottom of the receiving groove corresponding to the heat dissipation gel structure except the region where the groove is defined. It can be understood that the groove accommodates the magnetic attraction member, and the groove does not provide a first ventilation structure, that is, the groove is not hollowed out, which can prevent external dust particles, moisture, etc. from causing damage to the magnetic attraction member in the groove, and further protect the magnetism and service life of the magnetic attraction member. The first ventilation structure being provided at the bottom of the receiving groove corresponding to the heat dissipation gel structure except the region where the groove is defined, which can efficiently use the heat dissipation space, so that the outside air and the heat dissipation gel structure can be communicated efficiently in a large area to realize heat dissipation protection for the electronic device.

23. The thickness of the heat dissipation gel structure of the protective case is in the range of 1.0-1.2 mm; by controlling the thickness range of the heat dissipation gel structure, the entire heat dissipation gel structure is light and thin, giving users a comfortable experience and more conducive to heat dissipation.

24. The thickness of the flexible heat conduction layer of the protective case is in the range of 0.1-0.5 mm; the thickness of the flexible heat dissipation layer is in the range of 0.5-0.7 mm; the thickness of the flexible protective layer is in the range of 0.1-0.3 mm. The thickness range of the three flexible layers is realized by using the most effective heat dissipation thickness of each layer of flexible material to realize the lightness and effective heat dissipation of the three flexible layers.

25. The protective case reduces the temperature of the surface of the heat-generating electronic device within a range of 1-6° C., which can realize the safety protection of the electronic device.

26. The flexible protective layer of the protective case is provided with a second ventilation structure, and the aperture of the second ventilation structure is smaller than the aperture of the first ventilation structure on the case body. By providing the second ventilation structure with an aperture smaller than the aperture of the first ventilation structure, the difference in aperture size is used to make air convection faster, and the second ventilation structure with a smaller aperture is more conducive to dust-proof and waterproof, and realizes effective heat dissipation and protection for the electronic device.

27. The magnetic field of the magnetic attraction member of the protective case passes through the heat dissipation gel structure to magnetically attract the electronic device. It can be known that if the thickness of the medium between the magnet and the magnetically attracted object exceeds 2 mm, the magnetic attraction ability of the magnet will be greatly reduced. It is also known that the thickness of the heat dissipation gel structure is less than 2 mm. The magnetic field of the magnetic attraction member passes through the heat dissipation, which can maximize the magnetic attraction ability of the magnetic attraction member to the electronic device while ensuring the heat dissipation protection of the electronic device and further strengthening the fixed protection of the electronic device.

28. The protective case of the present disclosure can be used for mobile phones, Pads, PDAs, notebook computers or other small electronic devices, which can meet different usage needs of customers.

29. The first ventilation structure is not provided at the position of the protective case corresponding to the magnetic attraction member, which can prevent dust, water vapor, etc. in the external environment from affecting the performance of the magnetic attraction member, and is beneficial to improving the service life of the magnetic attraction member.

BRIEF DESCRIPTION OF DRAWINGS

In order to more clearly illustrate the technical solutions in the embodiments of the present disclosure, the following will briefly introduce the accompanying drawings that need to be used in the descriptions of the embodiments or the prior art. Obviously, the accompanying drawings in the following description are merely some embodiments of the present disclosure. Those of ordinary skill in the art can also obtain other drawings based on these drawings without paying creative efforts.

Figure 1:
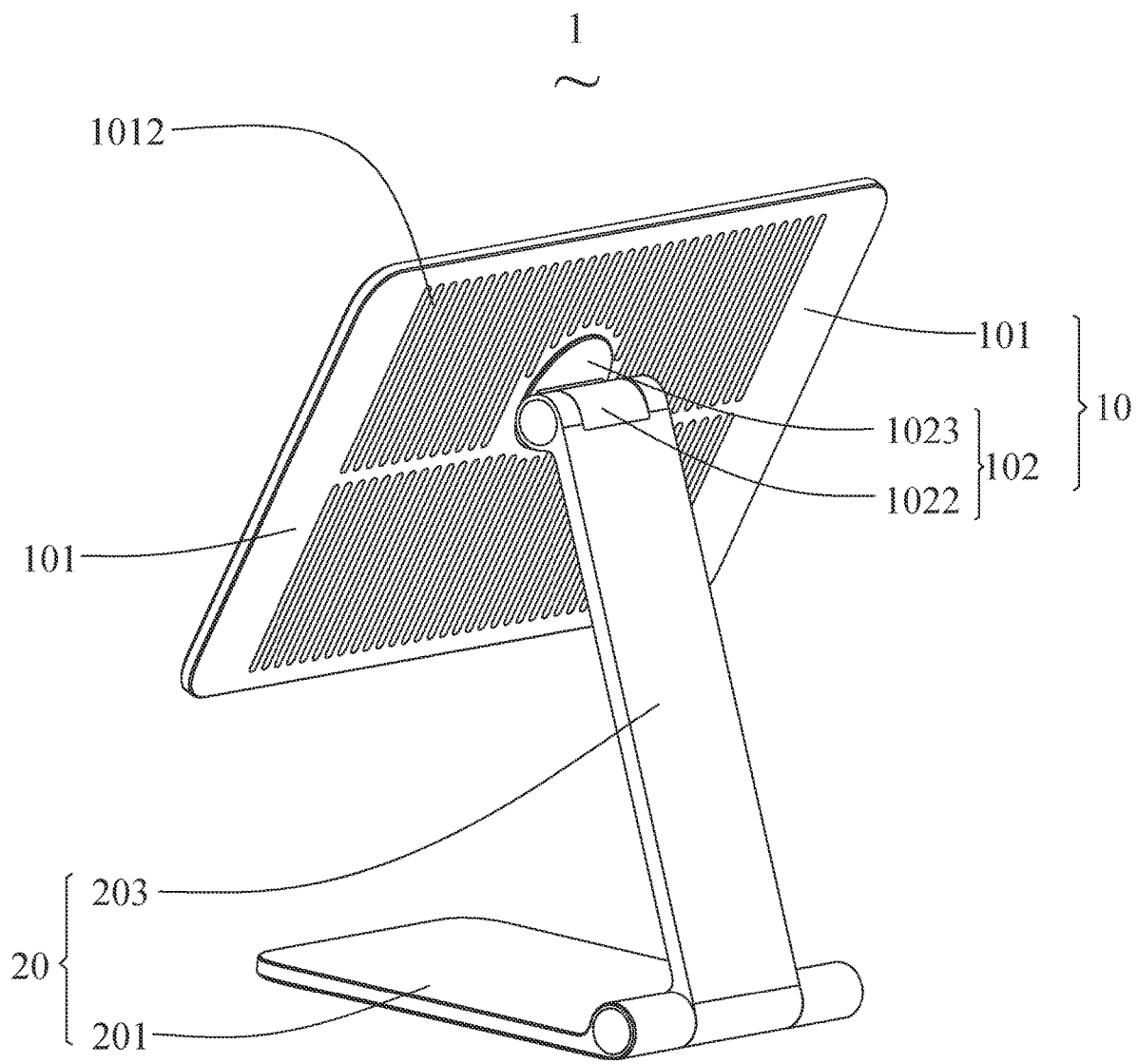
FIG. 1 is a perspective view of a heat dissipation holder according to a first embodiment of the present disclosure.

NUMERICAL REFERENCE IDENTIFICATION 1. heat dissipation holder; 100. electronic device;
10. positioning assembly; 20. support assembly; 30. heat dissipation gel structure;
101. bottom plate; 102. connecting member; 103. magnetic attraction member; 201. base; 203. support rod; 301. heat conduction layer; 302. heat dissipation layer; 303. protective layer;
1011, receiving groove; 1012, ventilation channel; 1013, through hole; 1014, groove; 1015, magnetic attraction strip; 1022, rotating shaft; 1023, connecting plate; 2012, anti-skid pad;
2. heat dissipation holder;
21. support assembly;
201, base; 202, telescopic assembly;
2021, fixed rod; 2022, movable rod;
3. heat dissipation holder; 5. electronic device;
22. support assembly; 23. heat dissipation gel structure;
211, bottom plate; 212, support plate; 221, support column; 222, base; 231, heat conduction layer; 232, heat dissipation layer; 233, protective layer;
2112, receiving groove; 2323, through hole;
4. heat dissipation holder; 6. electronic device;
40. support assembly; 50. positioning assembly; 60. heat dissipation gel structure;
402, connecting assembly; 501, bottom plate; 502, clamping assembly; 601, heat conduction layer; 602, heat dissipation layer; 603, protective layer;
5011, receiving groove; 5012, ventilation channel; 5013, plate cover; 5021, air-passable structure; 6031, ventilation structure;
7. protective case; 8. electronic device;
70. case body; 71. magnetic attraction member; 80. heat dissipation gel structure; 81. flexible heat conduction layer; 82. flexible heat dissipation layer; 83. flexible protective layer; 90. support block;
701. receiving groove; 702. first ventilation structure; 703. groove; 830. second ventilation structure.

DETAILED DESCRIPTION

In order to make the objectives, technical solutions, and advantages of the present disclosure clearer, the present disclosure is further described in detail below with reference to the accompanying drawings and embodiments. It should be understood that the specific embodiments described herein are provided for illustration only, and not for the purpose of limiting the disclosure.

It should be noted that when an element is referred to as being "fixed to" another element, it can be directly on the other element or intervening elements may also be present. When an element is referred to as being "connected" to another element, it can be directly connected to the other element or intervening elements may also be present. The terms "vertical," "horizontal," "left," "right," and similar expressions are used herein for illustrative purposes only.

It should be noted that, in the present disclosure, the terms "up", "down", "left", "right", "front", "rear", "top", "bottom", "inside", "outside", "middle", "vertical", "horizontal", "longitudinal", etc. are based on the orientations or positional relationships shown in the drawings. Terms herein are primarily used to better describe the disclosure and the embodiments, and are not intended to limit that the indicated device, element, or component must have a particular orientation, or be constructed and operated in a particular orientation.

In addition, some of the above-mentioned terms may be used to express other meanings besides orientation or positional relationship. For example, the term "on" may also be used to express a certain attachment or connection relationship in some cases. For those skilled in the art, the specific meanings of the above terms in the present disclosure can be understood according to specific situations.

Furthermore, the terms "install", "arrange", "provide", "connect", "contact" should be construed broadly. For example, it may be a fixed connection, a detachable connection, or an integral structure; it may be a mechanical connection, or an electrical connection; it may be directly connected, or indirectly connected through an intermediary, or an internal communication between two devices, elements, or components. For those skilled in the art, the specific meanings of the above terms in the present disclosure can be understood according to specific situations.

Figure 2:
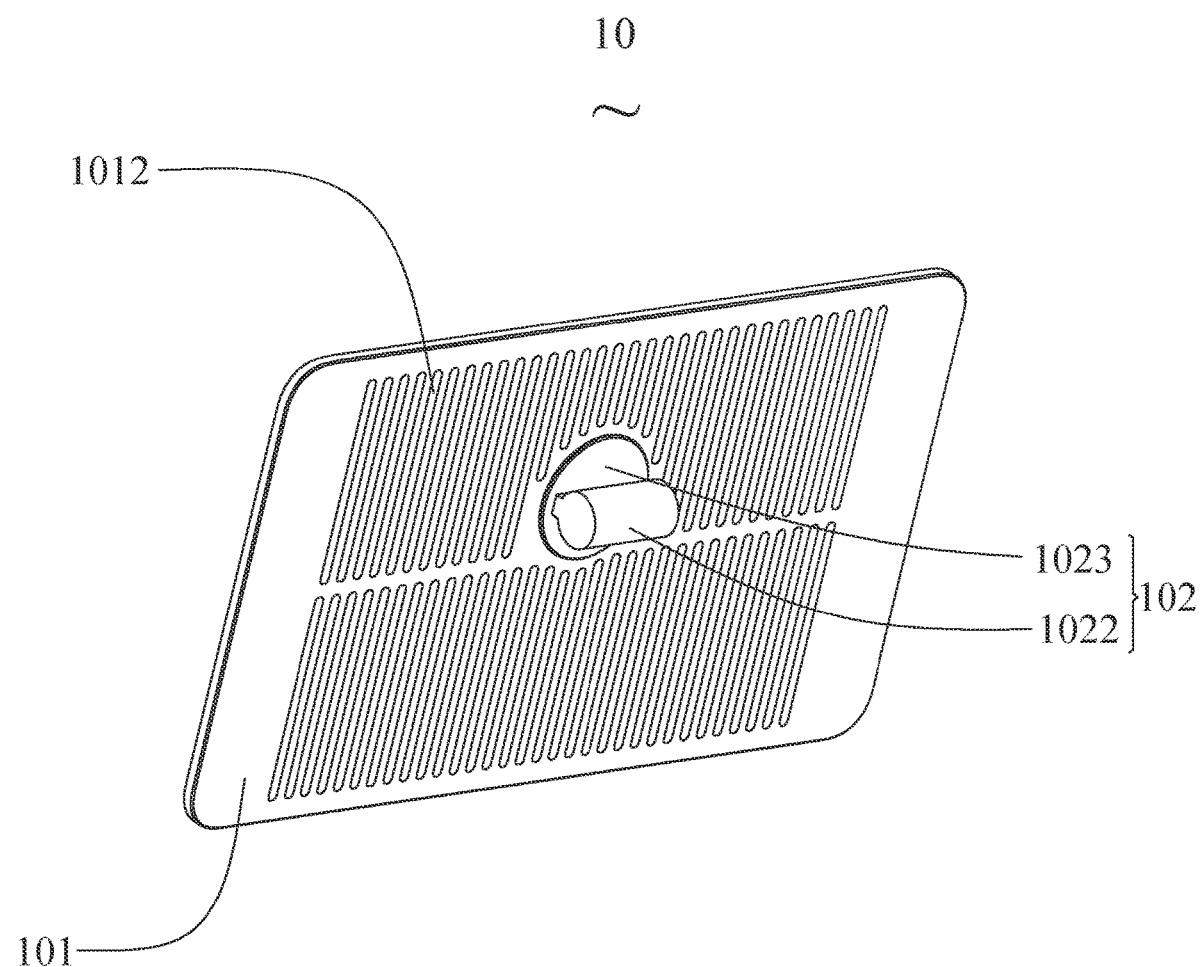
FIG. 2 is a perspective view of a positioning assembly of the heat dissipation holder according to the first embodiment of the present disclosure.
Figure 3:
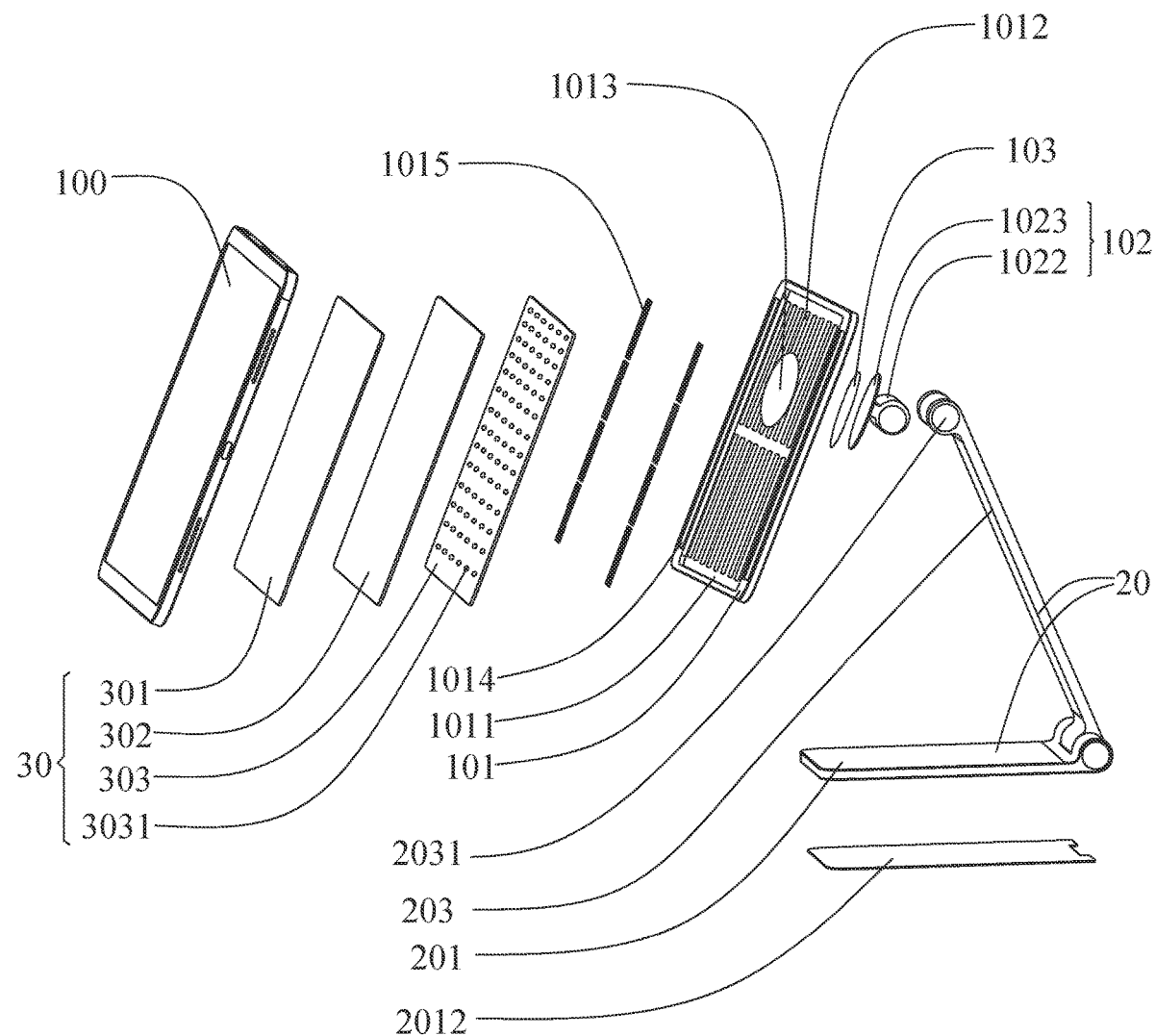
FIG. 3 is an exploded view of the heat dissipation holder according to the first embodiment of the present disclosure having an electronic device supported thereon.

Referring to FIGS. 1-3, a first embodiment of the present disclosure provides a heat dissipation holder 1, which is used to support and position an electronic device 100 and to dissipate heat for the electronic device 100. The heat dissipation holder 1 includes a support assembly 20 and a positioning assembly 10 connected to the support assembly 20. The positioning assembly 10 is used to secure the electronic device 100. The positioning assembly 10 includes a bottom plate 101 and a beat dissipation gel structure 30 disposed on the bottom plate 101, and at least part of the region of the bottom plate 101 corresponding to the heat dissipation gel structure 30 defines a ventilation channel 1012. One side of the heat dissipation gel structure 30 is in contact with the electronic device 100, and the other side thereof is connected to the ambiance through the ventilation channel 1012.

It can be understood that the heat dissipation holder 1 can be designed in different specifications according to the type and model of the electronic device 100. Optionally, the heat dissipation holder 1 may be but not limited to any one of a heat dissipation holder for mobile phones, for tablet computers, for notebook computers, and for e-readers, which can meet the different needs of users.

It can be understood that the heat dissipation holder 1 carries and secures the electronic device 100. The electronic device 100 generates heat when in use. One side of the heat dissipation gel structure 30 is in contact with the electronic device 100, and the other side thereof is communicated with outside air through the ventilation channel 1012 on the bottom plate 101. That is, outside air and air moisture can enter the heat dissipation gel structure 30 through the ventilation channel 1012, and then the electronic device 100 can be greatly and effectively radiated and cooled through the phase transition of the heat dissipation gel structure 30 to realize safe and user-friendly experience thereof.

Specifically, unlike traditional heat dissipation solutions that rely on passive heat dissipation such as material heat conduction and air convection or active heat dissipation such as built-in energy-consuming fans or semiconductor cooling chips, the heat dissipation gel structure 30 is like an artificial intelligence skin that is in contact with the electronic device 100. When the temperature of the electronic device 100 is normal, the heat dissipation gel structure 30 will spontaneously absorb and store the moisture in the surrounding air; when the temperature of the electronic device 100 is too high, the heat dissipation gel structure 30 will start to "sweat", that is, the stored moisture is evaporated through phase transition, thereby greatly reducing the temperature of the electronic device 100. When the temperature of the electronic device 100 decreases, the heat dissipation gel structure 30 stores air moisture again, and circulate like this to complete the heat dissipation and temperature reduction of the electronic device 100.

Further, the heat dissipation gel structure 30 is a phase-transition heat-dissipation structure containing hydrogel. Hydrogel is a quasi-solid material with a water content of more than 90%, which can simulate the sweating and heat dissipation process of organisms to reduce temperature. The hydrogel phase-transition heat-dissipation structure, that is, the heat dissipation gel structure 30 is a kind of extremely hydrophilic three-dimensional grid structure polymer, and its cross-linked grid structure can make it swell a large amount of water. After being heated, the moisture stored in the phase-transition structure of the hydrogel can be volatilized with heat in the form of water vapor. The heat dissipation gel structure 30 has an excellent heat dissipation effect, and every 1 g of water evaporated can take away about 2400J of heat.

Further, the phase transition temperature of the heat dissipation gel structure 30 is less than or equal to 45° C. It can be understood that the temperature of the electronic device 100 in normal use generally does not exceed 45° C., and if the internal temperature of the electronic device 100 is too high, the circuit and components therein will be damaged. By providing the heat dissipation gel structure 30 with the phase transition temperature less than or equal to 45° C., an effective and accurate temperature reduction can be achieved while improving the resource utilization. Further, the phase transition temperature of the heat dissipation gel structure 30 is in the range of 21° C.-44° C. Further, the phase transition temperature of the heat dissipation gel structure 30 is in the range of 21° C.-44° C. Specifically, the phase transition temperature of the heat dissipation gel structure 30 may be but not limited to 21° C., 25° C., 28° C., 30° C., 33° C., 35° C., 38° C., 40° C., 42° C. or 44° C.

Specifically, the heat dissipation gel structure 30 reduces the temperature of the electronic device 100 within a range of 1-6° C., which realizes the function of greatly and effectively cooling the electronic device, thereby realizing effective heat dissipation and protection for the electronic device 100.

Specifically, a TC-08 thermocouple data recorder, a T-type thermocouple and an infrared thermograph may be used to test the reducing temperature range of the heat dissipation gel structure. It can be obtained that the average temperature of each heat-generating point of the heat-generating surface with the heat dissipation gel structure can be reduced by up to 6° C. within one hour. The reasonable thickness of the heat dissipation gel structure is also one of the factors that are conducive to cooling, and the range of reducing temperature can be effectively adjusted according to the test data of the thermocouple.

Referring to FIG. 3 again, the heat dissipation gel structure 30 is a flexible material, and the heat dissipation gel structure 30 includes a heat conduction layer 301, a heat dissipation layer 302 including a heat dissipation hydrogel and a protective layer 303, which are sequentially stacked from a direction close to the electronic device 100 to a direction away from the electronic device 100. It can be understood that the heat of the electronic device 100 can be conducted to the heat dissipation layer 302 and the protective layer 303 through the heat conduction layer 301 for dissipation, and external water vapor can also be transmitted to the electronic device 100 through the heat dissipation layer 302, which can realize multiple protection of heat conduction, heat dissipation and protection for the electronic device 100. It can be understood that most of the internal heat of the electronic device 100 is dissipated from the back side thereof, and the heat conduction layer 301 is in contact with the back of the electronic device 100, which can realize effective heat conduction to the electronic device 100. Additionally, the heat conduction layer 301 can be used as a carrier to which the heat dissipation layer 302 is adhered. The heat dissipation gel structure 30 is a flexible material, which can play a flexible role in protecting the electronic device 100. It can be known that the hydrogel heat dissipation layer is a temperature-sensitive and flexible hydrogel film, which can sweat to dissipate heat like organisms, and absorb and store water at low temperature, such circulation will make it dissipate heat as simple and efficient as human skin, that is, the hydrogel heat dissipation layer can take away most of the heat through the principle of phase transition. Moreover, the protective layer 303 is close to the ventilation channel 1012, which can prevent external dust from adhering and damaging the heat dissipation layer 302 while providing an air moisture transmission path for the heat dissipation layer 302.

Further, the heat conduction layer 301 may be but not limited to a heat conduction silica gel layer, a heat conduction PET layer, a heat conduction PU layer, a heat conduction foam layer, a heat conduction leather film, a heat conduction rubber layer, a copper foil, a ceramic film, a glass film, or a graphene composite film, etc.

It can be known that the heat dissipation layer 302 contains heat dissipation hydrogel, that is, hydrogel. Specifically, the heat dissipation hydrogel includes at least one of acrylamide hydrogel, polyacrylamide hydrogel, 4-acetylacryloyl acetate hydrogel, sodium polyacrylate hydrogel, polyvinyl alcohol hydrogel, sodium alginate hydrogel and sodium carboxymethylcellulose hydrogel.

It can be known that the protective layer 303 is air-permeable, dust-proof or air-permeable and waterproof, which may be but not limited to polytetrafluoroethylene air-permeable film, non-woven fabric and the like. Specifically, in the embodiment of the present disclosure, the protective layer 303 is a non-woven material.

Referring to FIG. 3 again, a ventilation structure 3031 communicated with the ventilation channel 1012 is defined on the protective layer 303. It can be understood that the protective layer 303 needs to be air-permeable, dust-proof and waterproof, so a ventilation structure 3031 with small apertures needs to be formed, and the bottom plate 101, which pays more attention to the ventilation effect, is hollowed out with a ventilation channel 1012. The ventilation structure 3031 and the ventilation channel 1012 can be air-connected, which can ensure that the air and air moisture can flow through the ventilation channel 1012 to the ventilation structure 3031, and then to the heat dissipation layer 302, thereby achieving heat dissipation protection for the electronic device 100.

It can be understood that due to the material characteristics, the ventilation structure 3031 on the protective layer 303 has a plurality of tiny through-holes forming a tiny grid structure, that is, the aperture thereof is small, and the ventilation channel 1012 on the bottom plate 101. that pays more attention to the ventilation effect has a larger hollow area. When the temperature of the electronic device 100 is too high, the pressure of the surrounding gas increases relatively. At this time, gas turbulence will appear when the gas flows through the tiny grids. When the temperature is low, the pressure of the surrounding gas is relatively reduced. At this time, the gas flow has the characteristics of molecular flow. It can also be seen that the different ventilation areas of the ventilation structure 3031 and the ventilation channel 1012 will have different pressures of air circulation, so that the air circulation speed can be increased during convection, thereby improving the heat dissipation efficiency.

Optionally, the thickness of the heat dissipation gel structure 30 is in the range of 1.0-1.2 mm. It can be understood that by reasonably controlling the thickness range of the heat dissipation gel structure 30, the entire heat dissipation gel structure 30 can be light and thin, which can give users a comfortable experience while more conducive to heat dissipation. Preferably, the thickness of the heat dissipation gel structure 30 can be 1.0 mm, 1.1 mm and 1.2 mm.

Optionally, the thickness of the heat conduction layer 301 is in the range of 0.1-0.5 mm; the thickness of the heat dissipation layer 302 is in the range of 0.5-0.7 mm; the thickness of the protective layer 303 is in the range of 0.1-0.3 mm. By controlling the thickness ranges of the three flexible layers respectively, the most effective heat dissipation thickness of each layer of flexible material can be used to achieve the lightness and effective heat dissipation of the three flexible layers.

Preferably, the thickness of the heat conduction layer 301 can be 0.1 mm, 0.2 mm, 0.3 mm, 0.4 mm and 0.5 mm; the thickness of the heat dissipation layer 302 can be 0.5 mm, 0.6 mm and 0.7 mm; the thickness of the protective layer 303 can be 0.1 mm, 0.2 mm and 0.3 mm.

Referring to FIG. 3 again, the bottom plate 101 defines a receiving groove 1011 on the side thereof close to the heat dissipation gel structure 30, and the heat dissipation gel structure 30 is attached to and fitted with the bottom wall of the receiving groove 1011. The ventilation channel 1012 is provided on the bottom wall of the receiving groove 1011.

Further, the heat dissipation layer 302 and the protective layer 303 are accommodated and fitted in the receiving groove 1011. The areas of the heat dissipation layer 302 and the protective layer 303 match the area of the receiving groove 1011, and the area of the heat conduction layer 301 is larger than that of the heat dissipation layer 302 and the protective layer 303.

It can be understood that the thickness of the receiving groove 1011 is equivalent to the thickness of the heat dissipation gel structure 30, so that the side of the bottom plate 101 on which the electronic device 100 is secured is more flat. In actual use, the heat dissipation layer 302 and the protective layer 303 can be prevented from falling off from the bottom plate due to the coating effect of the receiving groove 1011, and the heat conduction layer 301, the heat dissipation layer 302 and the protective layer 303 can be bonded and fixed to prevent the heat dissipation gel structure 30 from falling off from the bottom plate 101.

Referring to FIG. 2 and FIG. 3, the positioning assembly 10 further includes a connecting member 102, the connecting member 102 includes a connecting plate 1023 connected to the side of the bottom plate 101 away from the receiving groove 1011. The end of the connecting member 102 away from the connecting plate 1023 is provided with a rotating shaft 1022. A shaft hole 203:1 is defined at one end of the support assembly 20 connected to the positioning assembly 10, and the rotating shaft 1022 is damply fitted with the shaft hole 2031. It can be understood that the positioning assembly 10 and the support assembly 20 can be connected via the above arrangement, and the damping fit thereof can allow the rotating shaft 1022 to be rotatably connected to the shaft hole 2031 and maintain the relative position thereof after rotation through the damping force, that is, after the electronic device 100 is fixed by the positioning assembly 10, the rotation adjustment of the usage angle of the electronic device 100 can be achieved to improve the practicality thereof.

Further, the positioning assembly 10 includes a magnetic attraction member 103 connected to the connecting plate 1023, the magnetic attraction member 103 is disposed between the bottom wall of the receiving groove 1011 and the heat dissipation gel structure 30 or in the bottom plate 101 or on the side of the bottom plate 101 away from the receiving groove 1011. The magnetic field of the magnetic attraction member 103 passes through the heat dissipation gel structure 30 to magnetically attract the electronic device 100, so as to fix the electronic device 100.

Optionally, the shape of the connecting plate 1023 may be but not limited to circular, rectangular or any other shape; specifically, in the embodiment of the present disclosure, the connecting plate 1023 is circular.

As an optional implementation, the magnetic attraction member 103 may be but not limited to fixed on the side of the connecting plate 1023 close to the heat dissipation gel structure 30 by pasting, clamping, embedding, etc. The area of the magnetic attraction member 103 can be less than or equal to the area of the connecting plate 1023.

As another optional implementation, the magnetic attraction member 103 is detachably disposed on the connecting plate 1023, for example, the connecting plate 1023 can be made of magnetic material, and the magnetic attraction member 103 can be detachably connected to the connecting plate 1023 by means of magnetic attraction. When the magnetic attraction member 103 is detached from the connecting plate 1023, the magnetic attraction member 103 can be connected to the bottom plate 101 and used individually, for example, it can be used by being adsorbed on the surface of other absorbable objects.

Further, the connection manners between the connecting member 102 and the bottom plate 101 may be but not limited to magnetic attraction, gluing, snapping or welding.

Specifically, in the embodiment of the present disclosure, the magnetic attraction member 103 is disposed in the bottom plate 101. More specifically, the bottom plate 101 defines a through hole 1013 penetrating through the bottom plate 101, the connecting plate 1023 is disposed at the through hole 1013, and the magnetic attraction member 103 is disposed on the connecting plate 1023.

It can be understood that the connecting plate 1023 is connected to the bottom plate 101 at the through hole 1013, specifically, the area of the connecting plate 1023 can match the area of the through hole 1013. The connecting plate 1023 can be engaged in the through hole 1013 by means of interference fit, gluing, welding, etc., as long as the connecting plate 1023 is firmly connected to the bottom plate 101. Additionally, the connecting plate 1023 is provided with a magnetic attraction member 103, which can magnetically fix the electronic device 100. The thicker the medium between the magnetic attraction member 103 and the electronic device 100, the lower the magnetic attraction performance will be. Therefore, the through hole 1013 can prevent the magnetic attraction member 103 from passing through the thickness of the bottom plate 101 to attract the electronic device 100, thereby strengthening the fix of the electronic device 100.

As an optional implementation, the position of the bottom plate 101 corresponding to the connecting plate 1023 may not provide the through hole 1013, and the connecting plate 1023 is directly connected to the side of the bottom plate 101 away from the heat dissipation gel structure 30 in this case. More preferably, the bottom plate 101 may be grooved to accommodate the magnetic attraction member 103, and the magnetic field of the magnetic attraction member 103 penetrates the bottom plate 101 along the direction away from the heat dissipation gel structure 30 to attract and fix an external magnetic attraction device.

Optionally, the side of the connecting plate 1023 close to the heat dissipation gel structure 30 may form a plane with the side of the bottom plate 101 close to the heat dissipation gel structure 30, or may form a protrusion, that is, the side of the connecting plate 1023 close to the heat dissipation gel structure 30 is higher than the side of the bottom plate 101 close to the heat dissipation gel structure 30. In this case, the position of the heat dissipation gel structure 30 corresponding to the connecting plate 1023 will hollow out part of the thickness along its own thickness direction, so as to match the height of the protrusion of the connecting plate 1023 relative to the bottom plate 101, thereby reducing the thickness of the longitudinal section of the positioning assembly 10, making it beautiful and light.

Specifically, in the first embodiment of the present disclosure, the side of the connecting plate 1023 close to the heat dissipation gel structure 30 is on the same plane as the side of the bottom plate 101 close to the heat dissipation gel structure 30, and the bottom plate 101 is provided with a ventilation channel 1012 with the gel structure 30 fitted and covered on the plane. It can be understood that due to the close fit of the plane, there is no gap between the heat dissipation gel structure 30 and the ventilation channel 1012, and the length of the heat dissipation path will not be increased. Thus better ventilation and heat dissipation effects can be obtained. In addition, instead of hollowing out matching holes in the position where the connecting plate 1023 is connected to the heat dissipation gel structure 30, the connecting plate 1023 is covered, which avoids hollowing out and further simplifies the manufacturing process under the premise of ensuring magnetic attraction and heat dissipation.

Further, in one embodiment of the present disclosure, the support assembly 20 includes a support rod 203 and a base 20: damply fitted with the support rod 203. Specifically, the support assembly 20 includes a non-stretchable support rod 203 and a base 201 damply fitted with the support rod 203. One side of the base 201 away from the support rod 203 is provided with an anti-skid pad 2012 to realize the anti-slip of the whole device, that is, one end of the support rod 203 is rotatably connected to the base 201, and the other end thereof is rotatably connected to the bottom plate 101.

Referring to FIG. 3 again, preferably, in one embodiment, a groove 1014 and a magnetic attraction strip 1015 disposed in the groove 1014 are further provided at the side of the bottom plate 101 facing the heat dissipation gel structure 30. It can be known that in the first embodiment of the disclosure, the heat dissipation layer 302 and the protective layer 303 are accommodated in the receiving groove 1011, and the heat conduction layer 301 covers the receiving groove 1011 and the magnetic attraction strip 1015. The magnetic field of the magnetic attraction strip 1015 passes through the heat conduction layer 301, that is, the magnetic field thereof passes through the heat dissipation gel structure 30 to magnetically attract the electronic device 100.

It can be understood that the larger and heavier the electronic device 100, the greater the required magnetic force. By providing the magnetic attraction strip 1015, the weight range of the electronic device 100 that can be carried may be increased, and the fixing of the electronic device 100 can be further strengthened. It can be understood that there may be a plurality of magnetic attraction strips 1015, which cooperate with the magnetic attraction member 103 to fix the electronic device 100. It can also be understood that the magnetic attraction member 103 may not be provided, and the electronic device can be fixed only through the magnetic attraction strips 1015.

Specifically, in the embodiment of the present disclosure, the grooves 1014 are disposed on opposite sides of the side of the bottom plate 101 facing the heat dissipation gel structure 30. It can be understood that the magnetic attraction member 103 is disposed in the middle of the bottom plate 101, and the magnetic attraction strips 1015 are arranged on both sides of the bottom plate 101 facing the magnetic attraction member 103, which can strengthen the magnetic attraction and fixing function of the positioning assembly to the electronic device 100.

Figure 4:
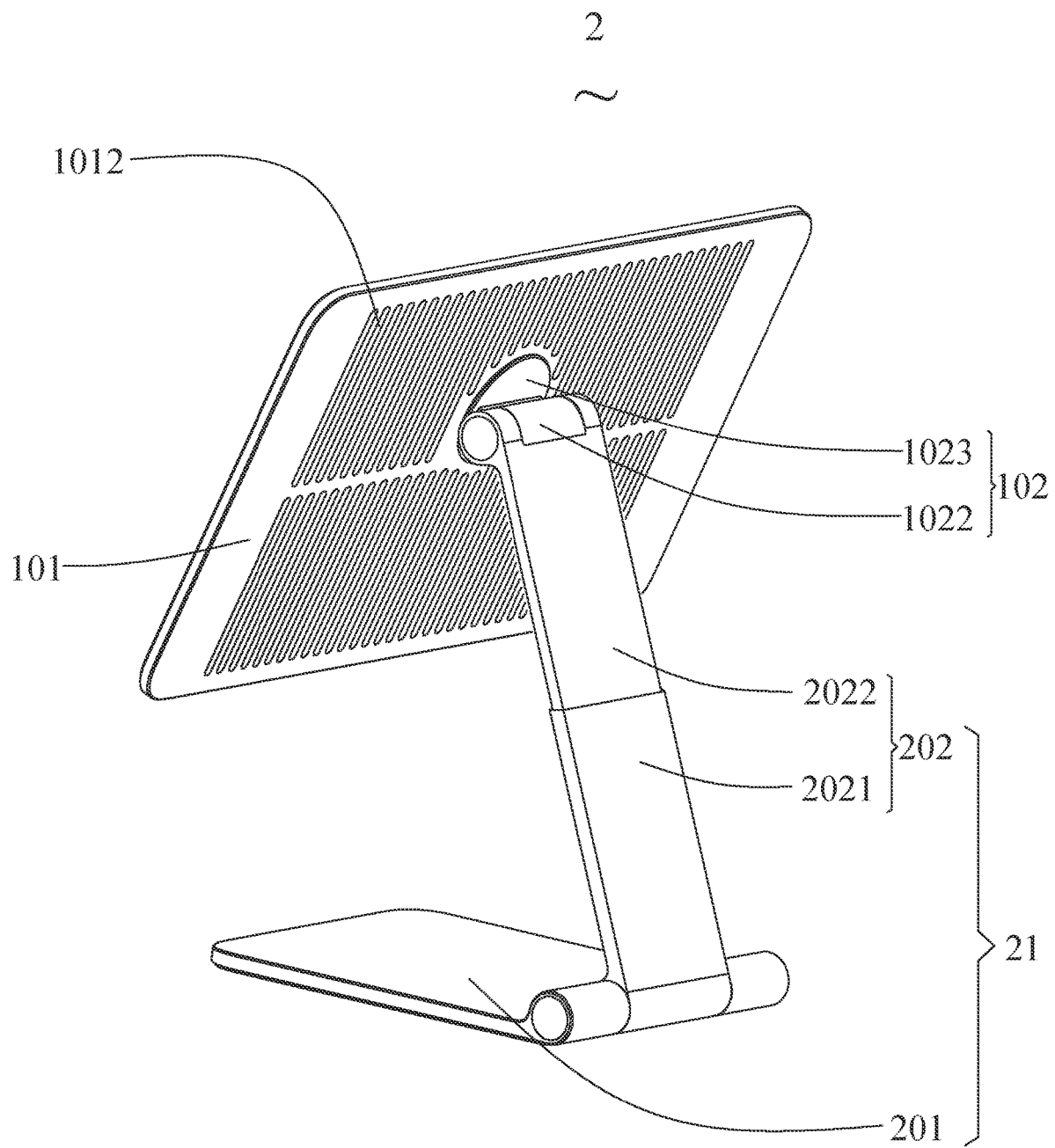
FIG. 4 is a perspective view of a heat dissipation holder with a telescopic function according to a second embodiment of the present disclosure.

Referring to FIG. 4, a second embodiment of the present disclosure provides a heat dissipation holder 2 for electronic equipment, which differs from the heat dissipation holder provided in the first embodiment of the present disclosure in that: the support assembly 21 includes a telescopic assembly 202 and a base 201 rotatably connected thereto. The telescopic assembly 202 has a telescopic function, and can well adjust the distance between the bottom plate 101 and the base 201. The telescopic assembly 202 includes a fixed rod 2021 and a movable rod 2022. The fixed rod 2021 is a hollow rod, one end thereof is rotatably connected to the base 201, and the movable rod 2022 is sleeved in the other end of the fixed rod 2021. The movable rod 2022 is in interference fit with the fixed rod 2021, that is, the movable rod 2022 can be moved to any position in the fixed rod 2021 along the axial direction of the fixed rod 2021 and then fixed, and one end of the movable rod 2022 is rotatably connected to the bottom plate 101.

It can be understood that the end of the fixed rod 2021 away from the movable rod 2022 is rotatably connected to the base 201, and the end of the movable rod 2022 away from the fixed rod 2021 is rotatably connected to the bottom plate 101.

It can be understood that, in some other embodiments, the fixed rod 2021 and the movable rod 2022 can move mutually by means of threads, buckles, springs, chute, air cylinder or hydraulic cylinder, as long as the fixed rod 2021 and the movable rod 2022 can be fixed at any position after mutually moved.

Specifically, the rotatable connections provided by the embodiments of the present disclosure are all damping fits, and the angle range of the above-mentioned rotation may be but not limited to 0-180°, so that when positioning the electronic device, the angle of the electronic device relative to the user can be adjusted to meet multi-angle use requirements.

Figure 5:
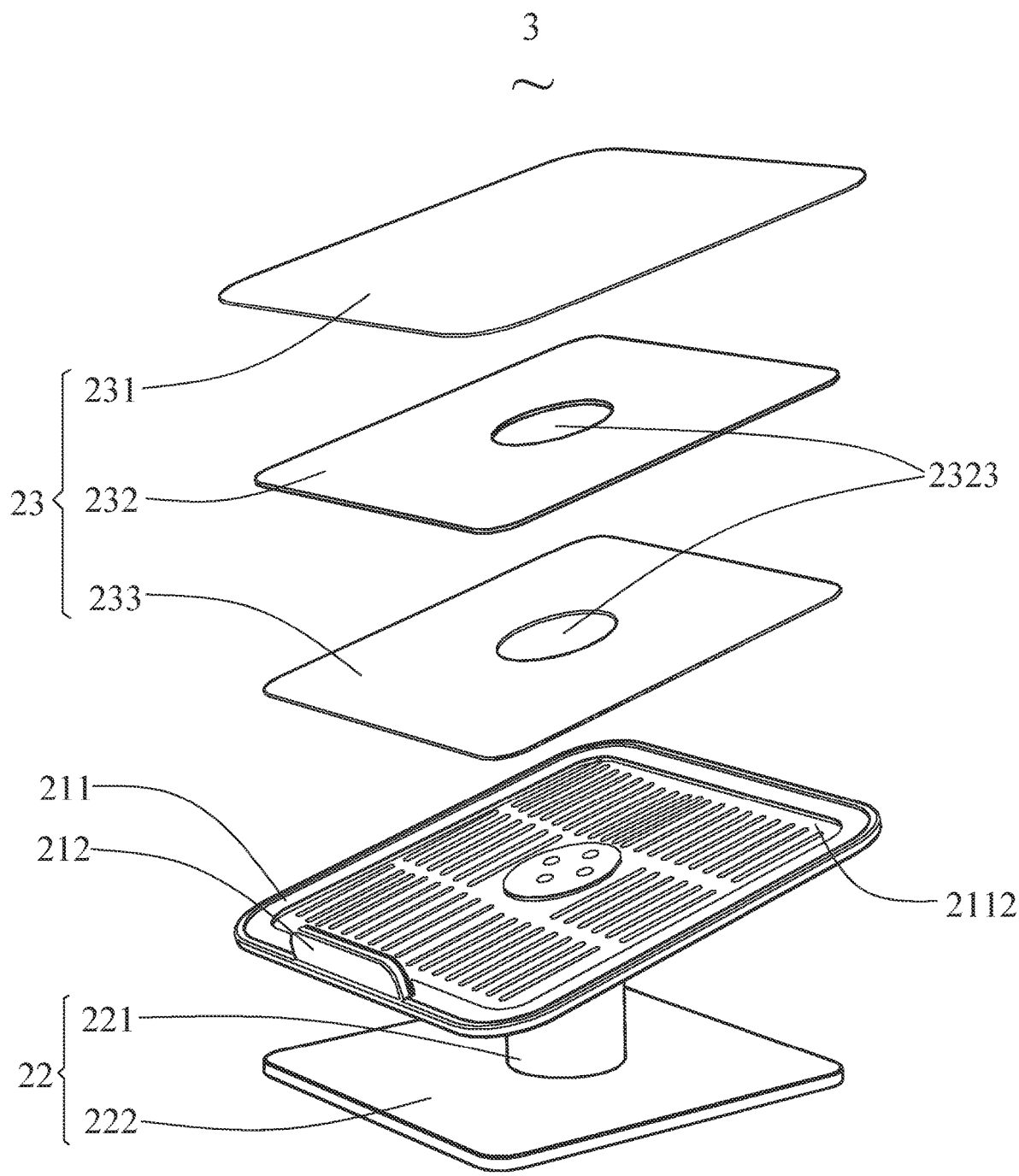
FIG. 5 is an exploded view of a heat dissipation holder according to a third embodiment of the present disclosure.
Figure 6:
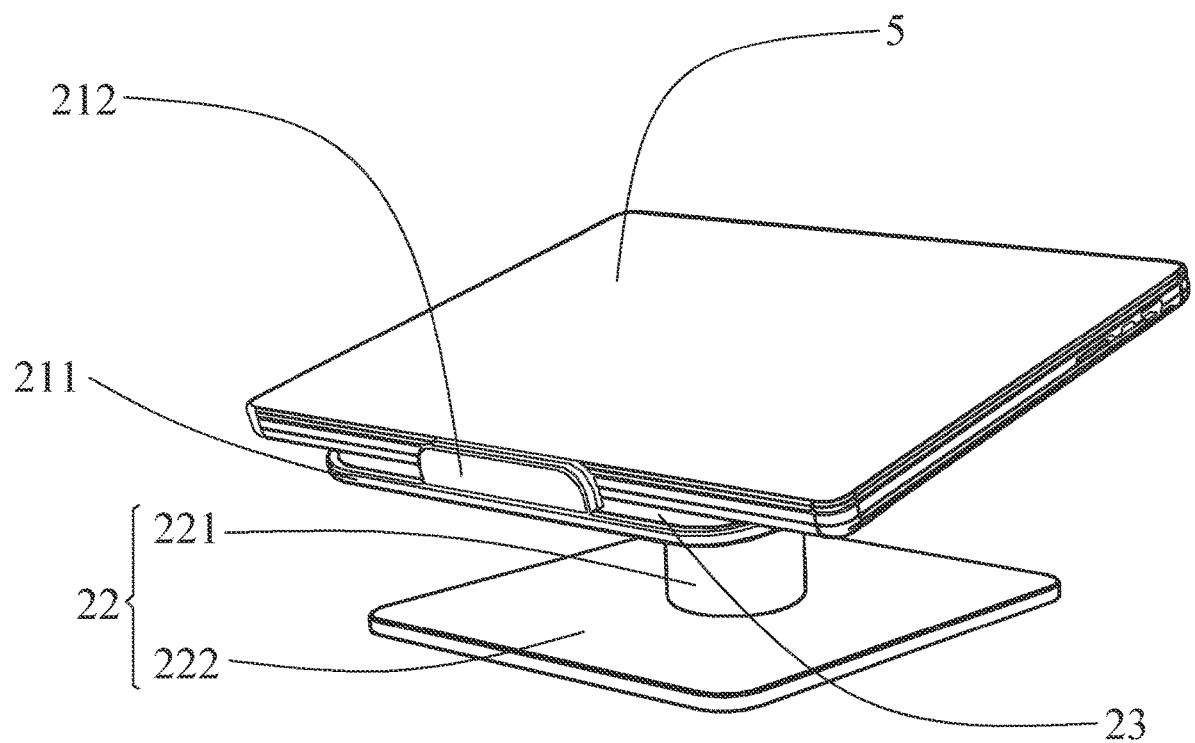
FIG. 6 is a perspective view of the heat dissipation holder according to the third embodiment of the present disclosure having an electronic device supported thereon.

Referring to FIG. 5 and FIG. 6 again, a third embodiment of the present disclosure provides a heat dissipation holder 3 for electronic equipment, which differs from the heat dissipation support 1 provided in the first embodiment mainly in that: the support assembly 22 of the third embodiment includes a support column 221 and a base 222, one end of the support column 221 is fixedly connected to the base 222 in a non-rotatable manner, and the other end thereof is connected to the bottom plate 211. The support column 221 protrudes from the plane of the bottom plate 211 by a certain height. The heat dissipation gel structure 23 is accommodated in the receiving groove 2112 of the bottom plate 211, and the position of the heat dissipation layer 232 and the protective layer 233 corresponding to the support column 221 is hollowed out a through hole 2323 matched therewith. The heat conduction layer 231 is not hollowed out. The end face of the end where the support column 221. is connected to the bottom plate 211 is an inclined plane at a certain angle to the horizontal plane, and the plane of the bottom plate 211 is also inclined at a certain angle to the horizontal plane. The magnetic attraction member and/or the magnetic attraction strips are not provided on the bottom plate 211. The side of the bottom plate 211 relatively close to the base 222 is provided with a support plate 212, and the support plate 212 is used to carry the electronic device 5.

Figure 7:
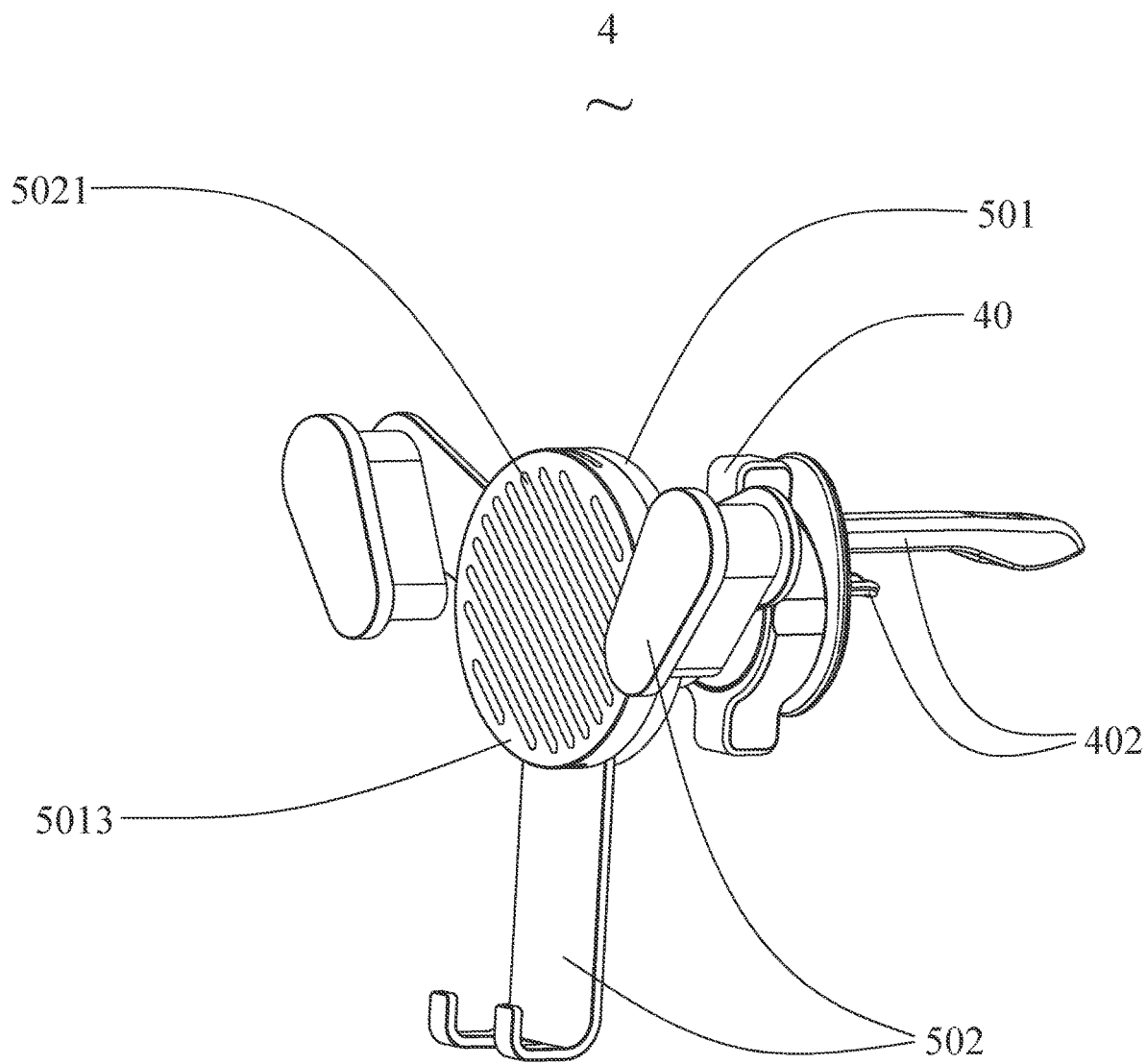
FIG. 7 is a perspective view of a heat dissipation holder according to a fourth embodiment of the present disclosure.
Figure 8:
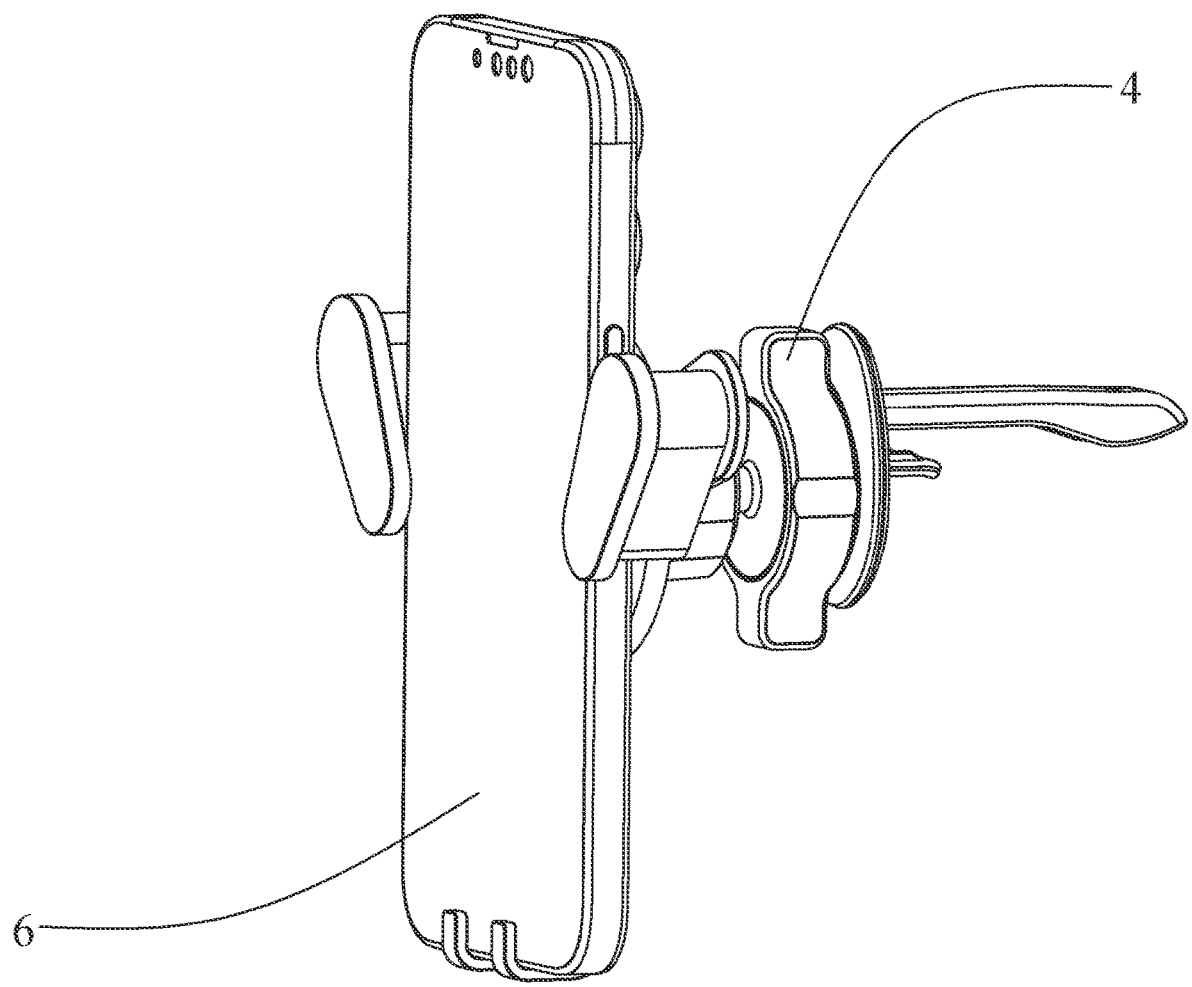
FIG. 8 is a perspective view of the heat dissipation holder according to the fourth embodiment of the present disclosure having an electronic device supported thereon.
Figure 9:
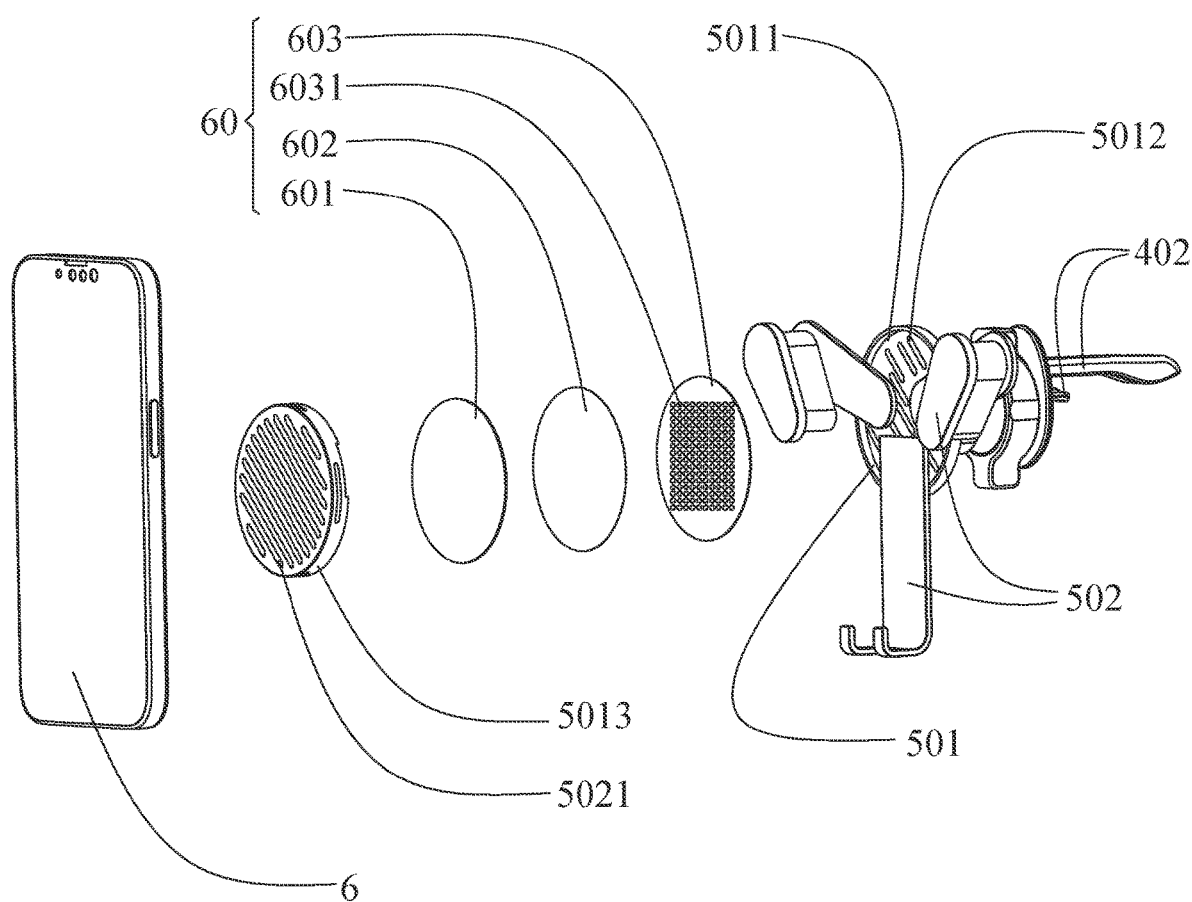
FIG. 9 is an exploded view of the heat dissipation holder according to the fourth embodiment of the present disclosure having an electronic device supported thereon.

Referring to FIG. 7-FIG. 9, a fourth embodiment of the present disclosure provides a heat dissipation holder 4 for electronic equipment, which includes a support assembly 40, a positioning assembly 50 and a heat dissipation gel structure 60. The heat dissipation holder 4 differs from the heat dissipation support 1 provided in the first embodiment mainly in that: the positioning assembly 50 of the fourth embodiment further includes a clamping assembly 502, which is connected to the bottom plate 501 to clamp an electronic device 6. The support assembly 40 further includes a connecting assembly 402, which is connected to the side of the bottom plate 501 away from the heat dissipation gel structure 60 to fix the heat dissipation holder 4 to an external device.

Further, the clamping assembly 502 may be but not limited to a claw or a chuck, etc., and its shape, quantity, working manner, and rotating or moving manner are not limited, as long as the clamping assembly 502 can support the electronic device 6. The connecting assembly 402 may be but not limited to splints or clips, etc., and its shape, quantity, or opening and closing manners are not limited, as long as the connecting assembly 402 can connect and fix the heat dissipation holder 4 to an external device, such as connecting and fixing it to the blade of the air outlet of a car. The connection manner between the clamping assembly 502, the base plate 501 and the connecting assembly 402 is not limited, as long as the electronic device 6 can be securely clamped.

Preferably, in the fourth embodiment of the present disclosure, the clamping assembly 502 is a claw structure; the connecting assembly 402 is two splints.

Specifically, the clamping assembly 502 is connected to the bottom plate 501 to form a clamping surface to clamp the electronic device 6. The clamping assembly 502 has a telescopic or rotating or moving function, and the size of the clamping surface can be adjusted by adjusting the motion state thereof. Therefore, the clamping requirements of electronic devices 6 with different volumes can be met.

Further, it can be understood that the bottom plate 501 has a certain thickness, which can directly accommodate the heat dissipation gel structure 60 and be in contact with the electronic device 6, and the bottom plate 501 may also include a plate cover 5013 to accommodate the heat dissipation gel structure 60 between the plate cover 5013 and the bottom plate 501. The plate cover 5013 plays a certain role in protecting the heat dissipation gel structure 60.

Optionally, the clamping assembly 502 may be fixed just in contact with the boundary of the bottom plate 501 or partly connected to the bottom plate 501 or connected to the side of the bottom plate 501. Specifically, in the fourth embodiment of the present disclosure, the clamping assembly 502 is partly connected to the bottom plate 501, that is, partly connected to the positioning assembly 50. The exposed part of the clamping assembly 502 is used to support the electronic device, and the clamping assembly 502 is provided with a spring, which is stretchable and shrinkable to fit and support electronic devices of different sizes. The positioning assembly 50 includes a base plate 501, and the base plate 501 is provided with a receiving groove 5011 for accommodating the heat dissipation gel structure 60. The bottom wall of the base plate 501 is also provided with a ventilation channel 5012, and a plate cover 5013 is provided at a position corresponding to the bottom wall of the base plate 501. The plate cover 5013 is provided with an air-passable structure 5021, one side of the plate cover 5013 is in contact with the electronic device 6, and the other side thereof is connected to the bottom plate 501 and the heat dissipation gel structure 60 is covered therein, so that the heat of the electronic device 6 can pass through the air-passable structure 5021 on the cover 5013 to enter into the heat dissipation gel structure 60. The heat dissipation gel structure 60 also includes a heat conduction layer 601, a heat dissipation layer 602 and a protective layer 603 sequentially arranged from a direction close to the electronic device 6 to a direction away from the electronic device 6. The ventilation structure 6031 of the protective layer 603 can communicate with the outside air through the ventilation channel 5012 on the bottom plate 501. The connecting assembly 402 is disposed away from the plate cover 5013. One end of the connecting assembly 402 is connected to the bottom plate 501, and the other end thereof is connected to an external device.

It can be understood that the support assembly 40 of the fourth embodiment is small, light, and portable, and the heat dissipation holder 4 of the fourth embodiment also has excellent heat dissipation function due to the heat dissipation gel structure 60.

Figure 10:
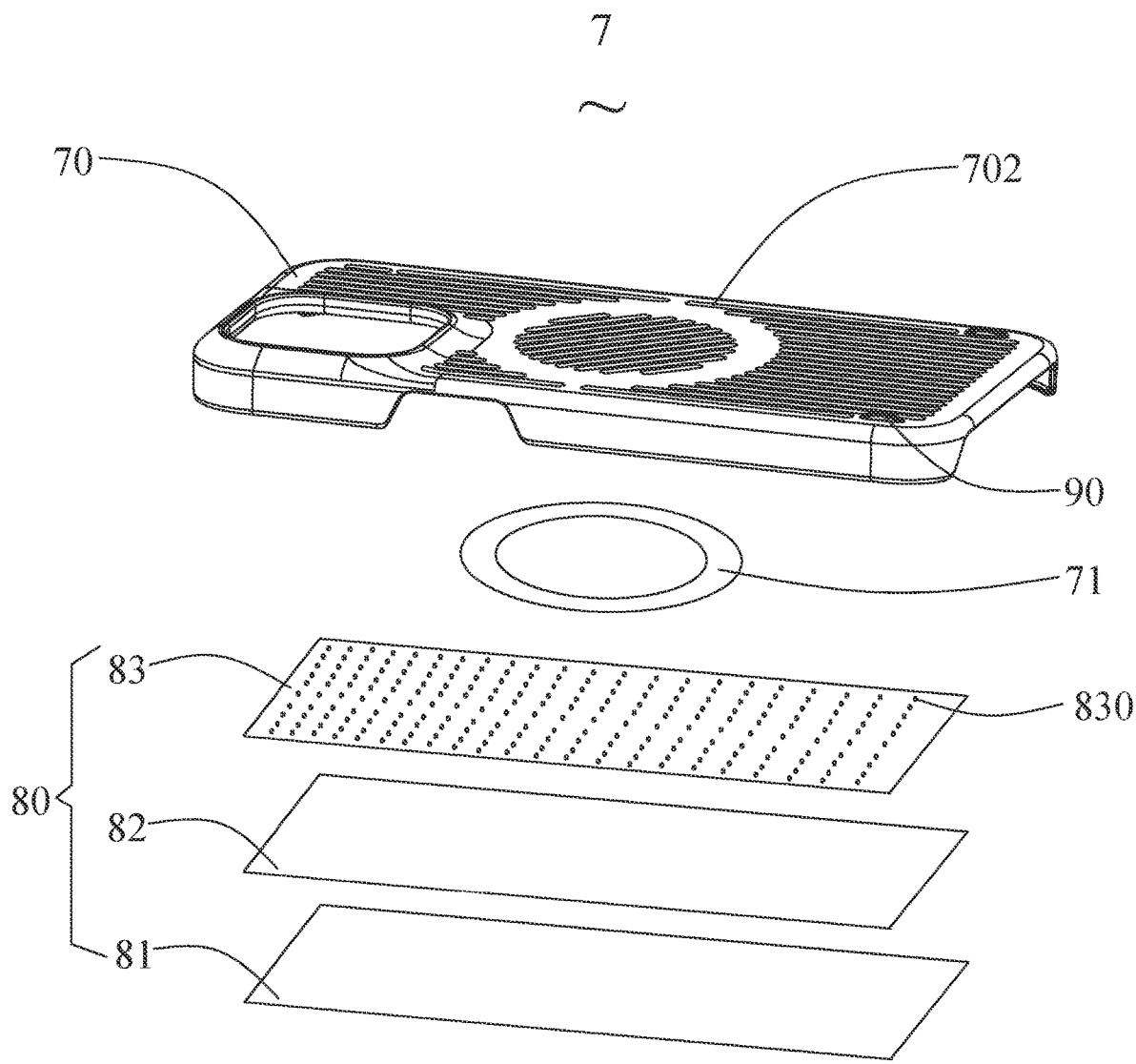
FIG. 10 is a schematic diagram of a protective case according to a fifth embodiment of the present disclosure.
Figure 11:
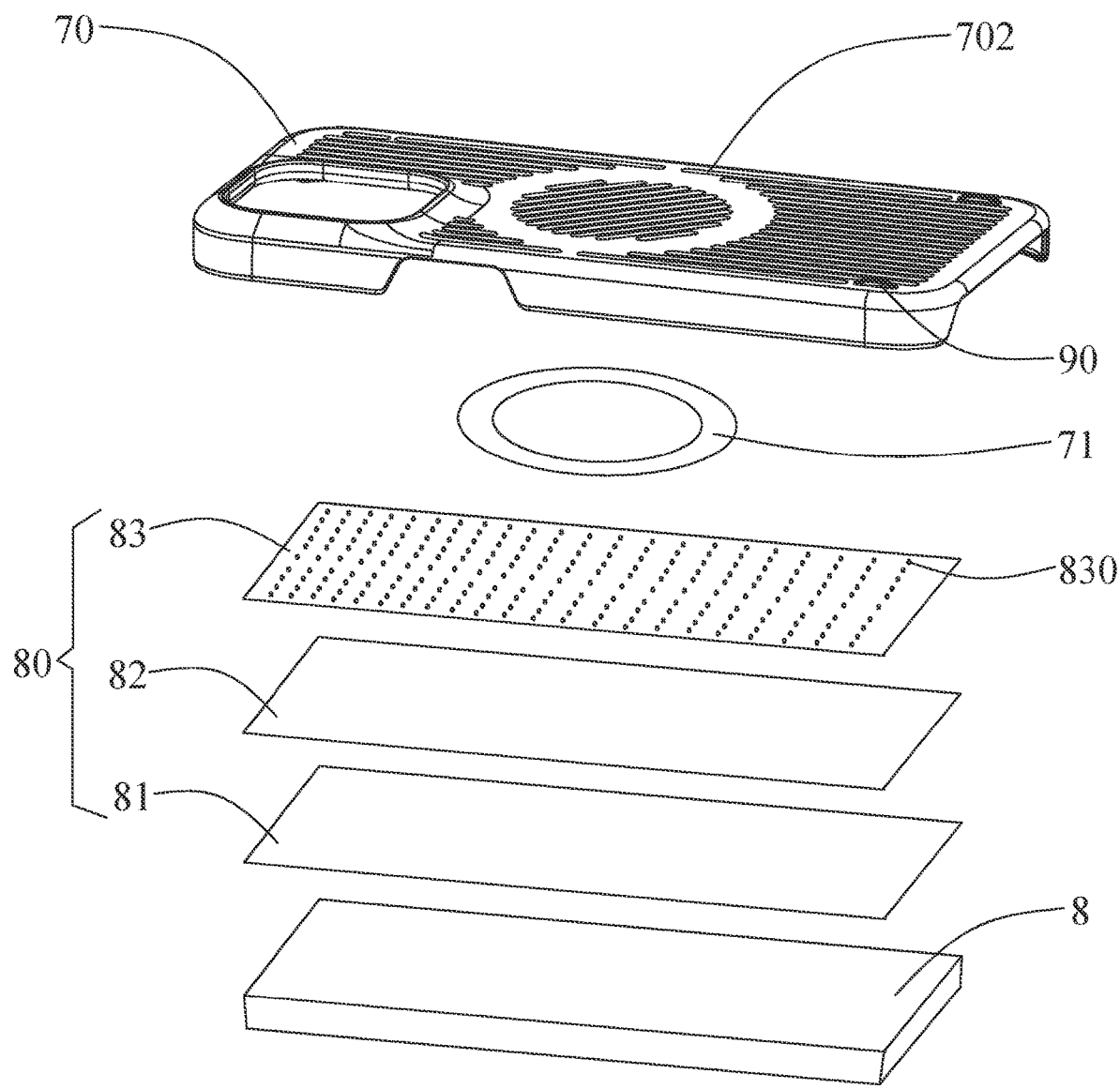
FIG. 11 is a schematic diagram of the protective case according to the fifth embodiment of the present disclosure mounted on an electronic device.
Figure 12:
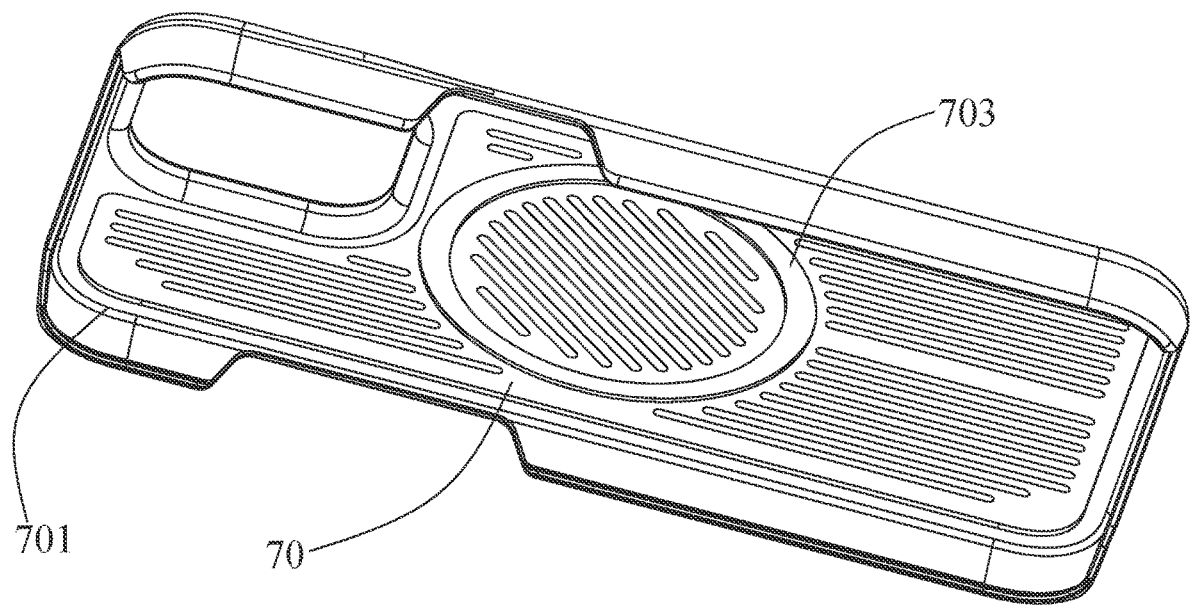
FIG. 12 is a schematic diagram of a case body of the protective case according to the fifth embodiment of the present disclosure.

Referring to FIG. 10-FIG. 12, a fifth embodiment of the present disclosure provides a protective case 7 for electronic equipment, which is used with an electronic device 8. The protective case 7 includes a case body 70 and a heat dissipation gel structure 80. The case body 70 defines a receiving groove 701 to accommodate the electronic device 8, and the heat dissipation gel structure 80 is disposed in the receiving groove 701. At least part of the region of the case body 70 corresponding to the heat dissipation gel structure 80 is provided with a first ventilation structure 702, and the heat dissipation gel structure 80 communicates with the ambiance through the first ventilation structure 702.

It can be understood that when the electronic device 8 is mounted with the protective case 7, one side of the heat dissipation gel structure 80 is in contact with the electronic device 8, and the other side thereof is close to the first ventilation structure 702 of the case body 70. Outside air and air moisture can enter the heat dissipation gel structure 80 through the first ventilation structure 702, and then through the phase-transition heat dissipation of the heat dissipation gel structure 80, the temperature of the electronic device 8 in contact with the heat dissipation gel structure 80 can be greatly reduced to ensure that the temperature inside the electronic device 8 is suitable. The protective case 7 has an excellent self-adaptive heat dissipation function, which realizes excellent heat dissipation and safety protection of the electronic device 8.

Specifically, the heat dissipation gel structure 80 is like a kind of artificial intelligence skin, which is placed on the surface of a heat-generating object. When the surface temperature of the heat-generating object is normal, the heat dissipation gel structure 80 will spontaneously absorb the moisture in the surrounding air and store it. When the surface temperature of the heat-generating object is too high, the heat dissipation gel structure 80 starts to "sweat", and the stored moisture evaporates through phase transition, which greatly reduce the surface temperature of the heat-generating object. When the temperature of the heat-generating object decreases, the heat dissipation gel structure 80 stores air moisture again, and circulate like this, to complete the heat dissipation and temperature reduction of the surface of the heat-generating object. In the embodiment of the present disclosure, the heat-generating object is the electronic device 8.

Further, the heat dissipation gel structure 80 is a phase-transition heat dissipation structure including hydrogel. Hydrogel is a quasi-solid material with a water content of more than 90%, which can simulate the sweating and heat dissipation process of organisms to reduce temperature. The hydrogel phase-transition heat dissipation structure, that is, the heat dissipation gel structure 80 is a kind of extremely hydrophilic three-dimensional grid structure polymer, and its cross-linked grid structure can make it swell a large amount of water. After being heated, the moisture in the phase-transition structure thereof can be volatilized with heat in the form of water vapor. The heat dissipation gel structure 80 has an excellent heat dissipation effect, and every 1 g of water evaporated can take away about 2400J of heat.

Further, the phase-transition temperature of the heat dissipation gel structure 80 is less than 45° C. It can be understood that the temperature of the electronic device 8 in normal use generally does not exceed 45° C. By providing the heat dissipation gel structure 80 with a phase transition temperature lower than 45° C., effective and precise temperature reduction can be achieved while resource utilization can be improved. Further, the phase transition temperature of the heat dissipation gel structure 80 is in the range of 21° C.-44° C.; specifically, the phase transition temperature of the heat dissipation gel structure 80 may be but not limited to 21° C., 25° C., 28° C., 30° C., 33° C., 35° C., 38° C., 40° C., 42° C. or 44° C.

Further, the heat dissipation gel structure 80 is a flexible material, and the hardness of the case body 70 is greater than that of the heat dissipation gel structure 80. It can be understood that the heat dissipation gel structure 80 has relatively good deformation ability, and when hitting an external hard object, the case body 70 first uses its strength and rigidity to provide a first protection to the electronic device 8, and then the impact force is transmitted to the heat dissipation gel structure 80 and weakened by the flexible material buffer thereof. The hardness of the heat dissipation gel structure 80 is lower than the hardness of the case body 70, which can achieve rigid and flexible protection for the electronic device 8 when it is impacted.

Further, the area of the first ventilation structure 702 accounts for 20%-70% of the plane area of the case body 70. It can be understood that by adjusting the proportion of different ventilation areas, the needs of different ventilation and heat dissipation efficiency can be met, and the balance of suitable materials and efficient heat dissipation can be achieved.

Referring to FIG. 10 again, at least a support block 90 is provided on the side of the case body 70 away from the heat dissipation gel structure 80. It can be understood that when the electronic device 8 is mounted with the protective case 7 and needs to be placed on a bearing surface such as a tabletop, the support block 90 can make the electronic device 8 be at a certain height from the bearing surface due to the certain height thereof, thereby further ensuring that air can enter the heat dissipation gel structure 80 smoothly from the space formed by the height thereof through the first ventilation structure 702 to achieve heat dissipation protection of the electronic device 8.

Referring to FIG. 10 again, the heat dissipation gel structure 80 includes a flexible heat conduction layer 81, a flexible heat dissipation layer 82 and a flexible protective layer 83 that are sequentially stacked from a direction away from the bottom of the receiving groove 701 to a direction close to the bottom of the receiving groove 701. It can be understood that, by providing the flexible heat conduction layer 81, the flexible heat dissipation layer 82 and the flexible protective layer 83 sequentially, the heat of the electronic device 8 is conducted to the flexible heat dissipation layer 82 and the flexible protective layer 83 through the flexible heat conduction layer 81 for dissipation, and the heat dissipation path can be transmitted from the ambiance to the electronic device 8 through the flexible heat dissipation layer 82 to realize multiple protections for heat conduction, heat dissipation and protection of the electronic device 8.

Specifically, the heat dissipation gel structure 80 includes a flexible heat conduction layer 81 in contact with the electronic device 8 and/or a flexible heat dissipation layer 82 containing heat dissipation hydrogel and/or an air-permeable, dust-proof and waterproof flexible protective layer 83.

Further, the flexible heat conduction layer 81 is a heat conduction layer in contact with the electronic device 8. The flexible heat conduction layer 81 may be but not limited to a heat conduction silicone layer, a heat conduction PET layer, a heat conduction PU layer, a heat conduction foam layer, a heat conduction leather film, a heat conduction rubber layer, a copper foil, a ceramic film, a glass film or a graphene composite film, etc. It can be understood that the flexible heat conduction layer 81 is in contact with the electronic device 8, which can realize effective heat conduction and collision flexible protection for the electronic device 8, and the flexible heat conduction layer 81 can be used as a carrier to which the heat dissipation layer 82 is adhered.

Further, the flexible heat dissipation layer 82 is a heat dissipation layer including a heat dissipation hydrogel. It can be understood that the heat dissipation hydrogel can store moisture in the air at low temperature, and evaporate the stored moisture at high temperature to take away heat from the electronic device 8.

Specifically, the heat dissipation hydrogel includes at least one of acrylamide hydrogel, polyacrylamide hydrogel, 4-acetylacryloyl acetate hydrogel, sodium polyacrylate hydrogel, polyvinyl alcohol hydrogel, alginic acid At least one of sodium hydrogel and sodium carboxymethylcellulose hydrogel. It can be understood that the above-mentioned hydrogel has a higher water content structure and a lower phase transition temperature, which can greatly improve the heat dissipation efficiency of the electronic device 8 to protect the electronic device 8.

Further, the flexible protective layer 83 is an air-permeable and dust-proof or air-permeable and waterproof protective layer. By selecting a air-permeable and dust-proof or air-permeable and waterproof protective layer, the heat dissipation layer can absorb moisture in the air to realize the heat dissipation effect of the electronic device 8, and the structure of the protective layer is beneficial to the dust-proof and waterproof protection of the electronic device 8.

Optionally, the flexible protective layer 83 may be but not limited to a polytetrafluoroethylene air-permeable film, a non-woven fabric, and the like. Specifically, in the embodiment of the present disclosure, the flexible protective layer 83 is a non-woven material.

Further, the areas of the flexible heat conduction layer 81 and the flexible protective layer 83 are greater than or equal to the area of the flexible heat dissipation layer 82. It can be understood that the flexible heat dissipation layer 82 having hydrogel is soft and elastic, has fluidity and high viscosity. The flexible heat conduction layer 81 and the flexible protective layer 83 protect the flexible heat dissipation layer 82 by means of wrapping and provide an attachable carrier for the flexible heat dissipation layer 82, which facilitates the uniform distribution and extension of the flexible heat dissipation layer 82 and better realizes the heat dissipation effect of the flexible heat dissipation layer 82.

It can be understood that the areas of the flexible heat conduction layer 81, the flexible heat dissipation layer 82, and the flexible protective layer 83 may be but not limited to: the areas of the flexible heat conduction layer 81, the flexible heat dissipation layer 82, and the flexible protective layer 83 are successively reduced or the area of the flexible heat dissipation layer 82 is larger than the area of the flexible protective layer 83 or other combinations of different areas, etc. Preferably, in the embodiment of the present disclosure, the area of the flexible heat conduction layer 81 or the flexible protective layer 83 is greater than or equal to the area of the flexible heat dissipation layer 82.

Referring to FIG. 11 again, the protective case 7 of the present disclosure also includes a magnetic attraction member 71, and the magnetic attraction member 71 is disposed on the case body 70. By providing the magnetic attraction member 71 on the case body 70, the electronic device 8 can be conveniently placed and fixed.

Optionally, the magnetic attraction member 71 can be disposed on the inner side of the case body 70 defining the receiving groove 701 or on the outer side thereof facing away from the receiving groove 701. Specifically, in the embodiment of the present disclosure, the magnetic attraction member 71 is disposed on the inner side of the case body 70 defining the receiving groove 701.

Further, the magnetic attraction member 71 is disposed between the case body 70 and the heat dissipation gel structure 80. By disposing the magnetic attraction member 71 between the case body 70 and the heat dissipation gel structure 80, the magnetic attraction member 71 can be attracted to an external magnetic device without the heat dissipation gel structure 80 placed therebetween to achieve the maximum magnetic attraction of the magnetic attraction member 71.

Specifically, the magnetic field of the magnetic attraction member 71 passes through the heat dissipation gel structure 80 to magnetically attract the electronic device 8. It can be known that if the thickness of the medium between the magnet and the magnetically attracted object exceeds 2 mm, the magnetic attraction ability of the magnet will be greatly reduced. It is also known that the thickness of the heat dissipation gel structure 80 is less than 2 mm. Therefore, by setting the magnetic field of the magnetic attraction member 71 to pass through the heat dissipation gel structure 80 to magnetically attract the electronic device 8, the heat dissipation protection of electronic device 8 is ensured while maximizing the magnetic attraction ability of the magnetic attraction member 71 to the electronic device 8, further strengthening the fixing protection of electronic device 8.

Further, a first ventilation structure 702 is not provided at the position corresponding to the housing of the magnetic attraction member 71, which can prevent dust and water vapor in external environment from affecting the performance of the magnetic attraction member 71, and is beneficial to improve the service life thereof.

Referring to FIG. 11 and FIG. 12 again, the position of the case body 70 corresponding to the heat dissipation gel structure 80 defines a groove 703 extending along the thickness direction of the case body 70, and the magnetic attraction member 71 is accommodated in the groove 703. By providing the groove 703 extending along the thickness direction of the case body 70 for accommodating the magnetic attraction member 71, firstly, the groove 703 can be used as a magnet protective housing to realize the function of accommodating and protecting the magnetic attraction member 71; secondly, the magnetic attraction member 71 is accommodated behind the groove 703, that is, accommodated in part of the region of the receiving groove 701 of the case body 70, which is beneficial for the case body 70 to form a flat plane to effectively contact and fix the electronic device 8, achieving aesthetics while more conducive to heat dissipation.

Optionally, the groove 703 can be provided on the inner side of the case body 70 defining the receiving groove 701 or on the outer side thereof facing away from the receiving groove 701 and extending along the thickness direction of the case body 70; specifically, in the embodiment of the present disclosure, the groove 703 is disposed on the inner side of the case body 70 defining the receiving groove 701.

Further, the magnetic attraction member 71 is a ring magnet, and the thickness of the magnetic attraction member 71 is less than or equal to the depth of the groove. By providing the ring magnet and the thickness thereof less than or equal to the depth of the groove, sufficient magnetic attraction is achieved while avoiding the protective case 7 being too thick to dissipate heat and carry.

Optionally, the shape of the magnetic attraction member 71 may be ring, square, rectangular or any other shape; specifically, in the embodiment of the present disclosure, the magnetic attraction member 71 is in the shape of a ring.

Optionally, the magnetic attraction member 71 can be a whole member or spliced by multiple magnetic pieces; specifically, in the embodiment of the present disclosure, the magnetic attraction member 71 is a ring-shaped member spliced by multiple magnetic pieces.

Referring to FIG. 11 and FIG. 12 again, the heat dissipation gel structure 80 covers the entire bottom of the receiving groove 701, the first ventilation structure 702 is not provided on the groove 703, and a first ventilation structure 702 is provided at the bottom of the receiving groove 701 corresponding to the heat dissipation gel structure 80 except the region where the groove 703 is defined.

It can be understood that the groove 703 accommodates the magnetic attraction member 71, and the groove 703 is not provided with the first ventilation structure 702, that is, the groove 703 is not hollowed out, so as to avoid damage to the magnetic attraction member 71 in the groove 703 by external dust particles and moisture and further protect the magnetism and service life of the magnetic attraction member 71. The first ventilation structure 702 is provided at the bottom of the receiving groove 701 corresponding to the heat dissipation gel structure 80 except the region where the groove 703 is defined, which can efficiently use the heat dissipation space, so that the outside air can efficiently communicate with the heat dissipation gel structure 80 in a large area to realize the heat dissipation protection of the electronic device 8.

Further, the thickness of the heat dissipation gel structure 80 is in the range of 1.0-1.2 mm. It can be understood that the heat dissipation efficiency of the heat dissipation gel structure 80 is very high, and high heat dissipation efficiency can be achieved without being too thick. On this premise, by controlling the thickness range of the heat dissipation gel structure 80, the entire heat dissipation gel structure 80 can be made light and thin, which is more conducive to heat dissipation while giving users a comfortable experience.

Optionally, the thickness of the heat dissipation gel structure 80 may be 1.0 mm, 1.1 mm, or 1.2 mm.

Further, the thickness of the flexible heat conduction layer 81 is in the range of 0.1-0.5 mm; the thickness of the flexible heat dissipation layer 82 is in the range of 0.5-0.7 mm; the thickness of the flexible protective layer 83 is in the range of 0.1-0.3 mm. By controlling the thickness ranges of the three flexible layers respectively, the most effective heat dissipation thickness of each layer of flexible material is used to realize the lightness and effective heat dissipation of the three flexible layers.

Optionally, the thickness of the flexible heat conduction layer 81 can be 0.1 mm, 0.2 mm, 0.3 mm, 0.4 mm and 0.5 mm; the thickness of the flexible heat dissipation layer 82 can be 0.5 mm, 0.6 mm and 0.7 mm; the thickness of the flexible protective layer 83 can be 0.1 mm, 0.2 mm and 0.3 mm.

Further, the reducing temperature of the protective case 7 to the surface of the electronic device 8 that generates heat is 1-6° C., which can realize the safe protection of the electronic device 8.

Further, after using the electronic device protective case 7 to reduce temperature, the temperature difference between the side of the electronic device 8 provided with the receiving groove 701 and the side thereof facing away from the receiving groove 701 is in the range of 2-3° C.

Specifically, using the TC-08 thermocouple data recorder, T-type thermocouple and infrared temperature-measuring thermal imager to test the reducing temperature range of the heat dissipation gel structure 80, it can be obtained that the average temperature of each heating point of the heat-generating surface having the heat dissipation gel structure 80 can be reduced by up to 6° C. within one hour. The reasonable thickness of the heat dissipation gel structure 80 is also one of the factors that are conducive to temperature reduction, and the temperature reduction range can be effectively adjusted according to the test data of the thermocouple.

Referring to FIG. 11 again, the flexible protective layer 83 is formed with a second ventilation structure 830, the aperture of the second ventilation structure 830 is smaller than the aperture of the first ventilation structure 702 on the case body 70. It can be understood that the air passes through the first ventilation structure 702 and the second ventilation structure 830 to enter the heat dissipation gel structure 80. When the temperature of the electronic device 8 is too high, the pressure of the surrounding gas is relatively increased, and micro-gas turbulence will appear when the gas flows through the small hole; when the temperature of the electronic device 8 is low, the pressure of the surrounding gas is relatively reduced, and the gas flow has molecular flow at this time. In addition, with different apertures and different pressures of air circulation, the air circulation speed can be increased during convection, and the heat dissipation efficiency can be improved. By forming a second ventilation structure 830 with an aperture smaller than the aperture of the first ventilation structure 702 on the flexible protective layer 83 in contact with the case body 70, the difference in aperture size is used to make air convection faster and the second ventilation structure 830 with a smaller aperture is more conducive to dust-proof and waterproof, so as to realize effective heat dissipation and protection for the electronic device 8.

Referring to FIG. 11 again, at least one support block 90 is provided on the side of the case body 70 away from the heat dissipation gel structure 80. It can be understood that when the electronic device 8 is mounted on the electronic device protective case 7 and needs to be placed on a bearing surface such as a tabletop, the certain thickness of the support block 90 can make the electronic device 8 be at a certain height from the bearing surface, thereby further ensuring that the air can smoothly enter the heat dissipation gel structure 80 from the space formed by the height through the first ventilation structure 702, and then realize heat dissipation and protection of the electronic device 8.

Furthermore, the protective case 7 of the present disclosure is used for mobile phones, Pads, PDAs, notebook computers or other small electronic devices, which can meet different usage requirements of customers.

Compared with the prior art, the heat dissipation holder for electronic equipment and the protective case for electronic equipment of the present disclosure have the following beneficial effects:

1. The heat dissipation holder for electronic equipment of the present disclosure is used to support and position an electronic device and to dissipate heat. The heat dissipation holder includes a support assembly and a positioning assembly connected to the support assembly, and the positioning assembly is used to contact and fix the electronic device. The positioning assembly includes a bottom plate, on which a heat dissipation gel structure is disposed, and at least part of the region of the bottom plate corresponding to the heat dissipation gel structure is provided with a ventilation channel. One side of the heat dissipation gel structure is in contact with the electronic device, and the other side thereof communicates with the ambiance through the ventilation channel. By providing the heat dissipation gel structure that not only contacts the electronic device but also communicates with the ambiance through the ventilation channel, a large and effective heat dissipation and temperature reduction of the electronic device carried thereon can be realized, and the safety of the electronic device and the excellent experience of the user can be achieved.

2. The bottom plate of the heat dissipation holder is provided with a receiving groove on the side thereof close to the heat dissipation gel structure, and the heat dissipation gel structure is attached to and fitted. with the bottom wall of the receiving groove. The bottom wall of the receiving groove is provided with a ventilation channel. It can be understood that the heat dissipation gel structure is attached to the bottom wall of the receiving groove of the bottom plate. In actual use, the covering effect of the receiving groove can prevent the heat dissipation gel structure from falling off from the bottom plate. In addition, the heat dissipation gel structure can be close to the ventilation channel to achieve effective ventilation and heat dissipation.

3. The heat dissipation holder further includes a connecting member, and the connecting member includes a connecting plate connected to the side of the bottom plate away from the receiving groove. A rotating shaft is provided at the end of the connecting member away from the connecting plate. One end of the support assembly used to connect the positioning assembly is provided with a shaft hole, and the rotating shaft is damply fitted with the shaft hole. It can be understood that the positioning assembly and the support assembly are connected, and the damping fit can allow the rotating shaft to be rotatably connected to the shaft hole and maintain the relative position after rotation through the damping force, that is, after the positioning assembly fixes the electronic device, the rotation adjustment of the use angle of the electronic device can be realized to improve the practicability thereof.

4. The positioning assembly further includes a magnetic attraction member connected to the connecting plate. The magnetic attraction member is disposed between the bottom wall of the receiving groove and the heat dissipation gel structure or in the bottom plate or on the side of the bottom plate away from the receiving groove. The magnetic field of the magnetic attraction member passes through the heat dissipation gel structure to magnetically attract the electronic device. It can be understood that the connection between the connection plate and the bottom plate is realized by providing the magnetic attraction member connected to the connecting plate and disposing the magnetic attraction member as described above, and the electronic device is fixed by the magnetic attraction member.

5. The bottom plate is further provided with a groove and a magnetic attraction strip arranged in the groove on the side thereof facing the heat dissipation gel structure, and the magnetic field of the magnetic attraction strip passes through the heat dissipation gel structure to magnetically attract the electronic device. It can be understood that the larger and heavier the electronic device, the greater the magnetic attraction force it needs. By providing the magnetic attraction strip, the weight range of the electronic device that can be carried can be increased, and the fixing of the electronic device can be further strengthened.

6. The positioning assembly further includes a clamping assembly connected to the bottom plate to clamp the electronic device. The support assembly also includes a connecting assembly connected to the side of the bottom plate away from the heat dissipation gel structure to secure the heat dissipation holder to an external device, which can achieve stable clamping of the electronic device and convenient connection with external devices.

7. The heat dissipation gel structure of the heat dissipation holder is a flexible material, and the heat dissipation gel structure includes a heat conduction layer, a heat dissipation layer containing a heat dissipation hydrogel and a protective layer that are sequentially stacked from a direction close to the electronic device to a direction away from the electronic device. It can be understood that the heat of the electronic device can be conducted to the heat dissipation layer and the protective layer for dissipation through the heat conduction layer, and the external water vapor can also be transmitted from the ambiance to the electronic device through the heat dissipation layer, which can realize heat conduction, heat dissipation and protection of the electronic device. In addition, it can be known that the hydrogel heat dissipation layer is a temperature-sensitive and flexible hydrogel film, which bionically sweats and dissipates heat at high temperature, and absorbs water for storage at low temperature. This cycle is as simple and efficient as human skin for heat dissipation. The principle of phase transition can take away most of the heat. Moreover, the protective layer is close to the ventilation channel, which can provide air and moisture transmission paths for the heat dissipation layer and prevent external dust from adhering and damaging the heat dissipation layer.

8. A ventilation structure communicated with the ventilation channel is formed on the protective layer of the heat dissipation holder. It can be understood that the protective layer needs to be air-permeable, dust-proof and waterproof, so a ventilation structure with small apertures needs to be formed. The bottom plate that pays more attention to the ventilation effect is hollowed out with the ventilation channel. The two can be air-connected to ensure that air and air moisture can be convection through the ventilation channel to the ventilation structure and then transferred to the heat dissipation layer, thereby achieving heat dissipation protection for the electronic device.

9. The reducing temperature of the heat dissipation gel structure to the electronic device is in the range of 1-6° C., which can realize the function of greatly and effectively cooling the electronic device.

10. The heat dissipation holder for electronic equipment of the present disclosure is any one of heat dissipation holder for mobile phones, for tablet computers, for notebook computers and for e-readers, which can meet the different needs of users.

11. The protective case for electronic equipment of the present disclosure is mounted on the exterior of an electronic device, and includes a case body, a magnetic attraction member and a heat dissipation gel structure. The case body forms a receiving groove for accommodating the electronic device, and the heat dissipation gel structure is formed in the receiving groove. At least part of the region of the case body corresponding to the heat dissipation gel structure is provided with a first ventilation structure, and the heat dissipation gel structure communicates with the ambiance through the first ventilation structure. By providing the heat dissipation gel structure, the protective case can have passive and active heat dissipation, which achieves excellent heat dissipation and safety protection for the electronic device.

12. The area of the first ventilation structure of the protective case accounts for 20%-70% of the plane area of the case body. It can be understood that by adjusting the proportion of different ventilation areas, the needs of different ventilation and heat dissipation efficiency 13. At least one support block is provided on the side of the case body of the protective case away from the heat dissipation gel structure. It can be understood that when the electronic device is equipped with the protective case needs to be placed on a bearing surface such as a tabletop, the support block can make the electronic device be at a certain height from the bearing surface because of the certain height thereof, thereby further ensuring that air can enter the heat dissipation gel structure smoothly from the space formed by height through the first ventilation structure to realize the heat dissipation protection of the electronic device.
14. The heat dissipation gel structure of the protective case is a flexible material, and the hardness of the case body is greater than that of the heat dissipation gel structure. By setting the hardness of the heat dissipation gel structure to be smaller than the hardness of the case body, when the case body hits external hard objects, the transmission of force will be greatly weakened by the case body and heat dissipation gel structure with different hardness, so as to realize the flexible protection of the electronic device.
15. The heat dissipation gel structure of the protective case includes a flexible heat conduction layer, a flexible heat dissipation layer and a flexible protective layer that are sequentially stacked from the bottom away from the receiving groove to the bottom close to the receiving groove. The flexible heat conduction layer, flexible heat dissipation layer and flexible protective layer realize the multiple protection of heat conduction, heat dissipation and protection of the electronic device.
16. The heat dissipation gel structure of the protective case includes a flexible heat conduction layer contacting the electronic device and/or a flexible heat dissipation layer containing heat dissipation hydrogel and/or a air-permeable, dust-proof and waterproof flexible protective layer. It can be understood that by selecting flexible and heat conduction materials to contact the electronic device, effective heat conduction and flexible collision protection for the electronic device can be achieved. By selecting a heat dissipation layer containing heat dissipation gel, the hydrogel absorbs water at room temperature, and take away heat at high temperature to achieve heat dissipation protection for the electronic device. By selecting a air-permeable, dust-proof, and waterproof protective layer, it is beneficial for the heat dissipation layer to absorb moisture in the air, which can achieve heat dissipation effect of the electronic device. The structure of the protective layer is conducive to the dust-proof and waterproof protection of the electronic device.
17. The area of the flexible heat conduction layer or the flexible protective layer of the protective case is greater than or equal to the area of the flexible heat dissipation layer, which can realize the coating protection of the flexible heat conduction layer or the flexible protective layer on the flexible heat-dissipating layer, and better realize heat dissipation effect of the flexible heat dissipation layer.
18. The protective case further includes a magnetic attraction member, which is disposed on the case body. By providing the magnetic attraction member on the case body, convenient placement and fixing of the electronic device can be realized.
19. The magnetic attraction member of the protective case is disposed between the case body and the heat dissipation gel structure. By specifically disposing the magnetic attraction member between the case body and the heat dissipation gel structure, the magnetic attraction member can be attracted to an external magnetic device without passing through the heat dissipation gel structure to achieve the maximum magnetic attraction of the magnetic attraction member.
20. The case body of the protective case is provided with a groove extending along the thickness direction of the case body at the position thereof corresponding to the beat dissipation gel structure, and the magnetic attraction member is accommodated in the groove. By providing the groove in the direction extending along the thickness of the housing, firstly, the groove can serve as a magnetic protective housing to accommodate and protect the magnetic attraction member; secondly, the magnetic attraction member is accommodated behind the groove, that is, accommodated on part of the region of the groove of the case body, which is conducive to forming a flat surface of the case body to effectively contact and fix the electronic device and can achieve aesthetics and more conducive to heat dissipation.
21. The magnetic attraction member of the protective case is a ring magnet, and the thickness of the magnetic attraction member is less than or equal to the depth of the groove. By providing the ring magnet with the thickness thereof less than or equal to the depth of the groove, sufficient magnetic attraction force can be achieved while avoiding the thickness of the protective case being too thick to dissipate heat and carry.
22. The heat dissipation gel structure of the protective case covers the entire bottom of the receiving groove, and the first ventilation structure is not provided on the groove. The the first ventilation structure is provided at the bottom of the receiving groove corresponding to the heat dissipation gel structure except the region where the groove is defined. It can be understood that the groove accommodates the magnetic attraction member, and the groove does not provide a first ventilation structure, that is, the groove is not hollowed out, which can prevent external dust particles, moisture, etc. from causing damage to the magnetic attraction member in the groove, and further protect the magnetism and service life of the magnetic attraction member. The first ventilation structure being provided at the bottom of the receiving groove corresponding to the heat dissipation gel structure except the region where the groove is defined, which can efficiently use the heat dissipation space, so that the outside air and the heat dissipation gel structure can be communicated efficiently in a large area to realize heat dissipation protection for the electronic device.
23. The thickness of the heat dissipation gel structure of the protective case is in the range of 1.0-1.2 mm; by controlling the thickness range of the heat dissipation gel structure, the entire heat dissipation gel structure is light and thin, giving users a comfortable experience and more conducive to heat dissipation.
24. The thickness of the flexible heat conduction layer of the protective case is in the range of 0.1-0.5 mm; the thickness of the flexible heat dissipation layer is in the range of 0.5-0.7 mm; the thickness of the flexible protective layer is in the range of 0.1-0.3 mm. The thickness range of the three flexible layers is realized by using the most effective heat dissipation thickness of each layer of flexible material to realize the lightness and effective heat dissipation of the three flexible layers.
25. The protective case reduces the temperature of the surface of the heat-generating electronic device within a range of 1-6° C., which can realize the safety protection of the electronic device.
26. The flexible protective layer of the protective case is provided with a second ventilation structure, and the aperture of the second ventilation structure is smaller than the aperture of the first ventilation structure on the case body. By providing the second ventilation structure with an aperture smaller than the aperture of the first ventilation structure, the difference in aperture size is used to make air convection faster, and the second ventilation structure with a smaller aperture is more conducive to dust-proof and waterproof, and realizes effective heat dissipation and protection for the electronic device.
27. The magnetic field of the magnetic attraction member of the protective case passes through the heat dissipation gel structure to magnetically attract the electronic device. It can be known that if the thickness of the medium between the magnet and the magnetically attracted object exceeds 2 mm, the magnetic attraction ability of the magnet will be greatly reduced. It is also known that the thickness of the heat dissipation gel structure is less than 2 mm. The magnetic field of the magnetic attraction member passes through the heat dissipation, which can maximize the magnetic attraction ability of the magnetic attraction member to the electronic device while ensuring the heat dissipation protection of the electronic device and further strengthening the fixed protection of the electronic device.
28. The protective case of the present disclosure can be used for mobile phones, Pads, PDAs, notebook computers or other small electronic devices, which can meet different usage needs of customers.
29. The first ventilation structure is not provided at the position of the protective case corresponding to the magnetic attraction member, which can prevent dust, water vapor, etc. in the external environment from affecting the performance of the magnetic attraction member, and is beneficial to improving the service life of the magnetic attraction member.

The above descriptions are only preferred embodiments of the present disclosure, and are not intended to limit the present disclosure. Any modifications, equivalent replacements and improvements within the principles of the present disclosure shall be included within the protection scope of the present disclosure.

The invention claimed is:

1. A protective case for electronic equipment, which is mounted on the exterior of an electronic device, comprising:
    a case body and a heat dissipation gel structure; the case body defining a receiving groove for accommodating the electronic device, and the heat dissipation gel structure being disposed in the receiving groove; a first ventilation structure being defined on at least part of the region of the case body on which the heat dissipation gel structure is disposed, and the heat dissipation gel structure being communicated with ambiance through the first ventilation structure
    wherein the protective case for electronic equipment further comprises a magnetic attraction member disposed on the case body; a groove extending along thickness direction of the case body being defined at a position of the case body on which the heat dissipation gel structure is disposed, and the magnetic attraction member is accommodated in the groove; the magnetic attraction member being a ring magnet.

2. The protective case for electronic equipment according to claim 1, wherein the area of the first ventilation structure accounts for 20%-70% of plane area of the case body.

3. The protective case for electronic equipment according to claim 1, wherein at least one support block is provided on one side of the case body away from the heat dissipation gel structure.

4. The protective case for electronic equipment according to claim 1, wherein the heat dissipation gel structure is a flexible material, and the hardness of the case body is greater than that of the heat dissipation gel structure.

5. The protective case for electronic equipment according to claim 1, wherein the heat dissipation gel structure comprises a flexible heat conduction layer, a flexible heat dissipation layer and a flexible protective layer; and/or the heat dissipation gel structure comprising the flexible heat conduction layer in contact with the electronic device and/or the flexible heat dissipation layer containing heat dissipation hydrogel and/or the air-permeable, waterproof and dust-proof flexible protective layer.

6. The protective case for electronic equipment according to claim 5, wherein the area of the flexible heat conduction layer or the flexible protective layer is greater than or equal to the area of the flexible heat dissipation layer; or the flexible protective layer defining a second ventilation structure; aperture of the second ventilation structure is smaller than aperture of the first ventilation structure on the case body.

7. The protective case for electronic equipment according to claim 1, wherein the thickness of the magnetic attraction member being less than or equal to the depth of the groove; or the heat dissipation gel structure covering bottom of the receiving groove; the first ventilation structure being not provided on the groove, and the first ventilation structure being provided at the bottom of the receiving groove corresponding to the heat dissipation gel structure except the region where the groove is defined.

8. The protective case for electronic equipment according to claim 1, wherein the magnetic attraction member is disposed between the case body and the heat dissipation gel structure, and the magnetic field of the magnetic attraction member passes through the heat dissipation gel structure to magnetically attract the electronic device.

9. The protective case for electronic equipment according to claim 5, wherein thickness of the flexible heat conduction layer is in the range of 0.1-0.5 mm, thickness of the flexible heat dissipation layer is in the range of 0.5-0.7 mm, and thickness of the flexible protective layer is in the range of 0.1-0.3 mm; or thickness of the heat dissipation gel structure is in the range of 1.0-1.2 mm.

10. The protective case for electronic equipment according to claim 1, wherein the reducing temperature of the protective case for electronic equipment to the surface of the electronic device that generates heat is in the range of 1-6° C.

11. The protective case for electronic equipment according to claim 1, wherein the protective case for electronic equipment is used for mobile phones, iPads, PDAs, notebook computers or other small electronic devices.

* * * * *